United States Patent
Endo et al.

[11] Patent Number: 5,917,436
[45] Date of Patent: Jun. 29, 1999

[54] MAP DISPLAY APPARATUS

[75] Inventors: Yoshinori Endo, Mito; Toshio Fujiwara, Hitachi; Hiroshi Shojima, Kashiwa; Motoki Hirano, Tokyo; Kaoru Harada, Yokohama; Tetsumori Aikawa, Sagamihara, all of Japan

[73] Assignees: Hitachi, Ltd., Tokyo; Xanavi Informatics Corporation, Zama, both of Japan

[21] Appl. No.: 08/636,767

[22] Filed: Apr. 19, 1996

[30] Foreign Application Priority Data

Apr. 20, 1995 [JP] Japan ................................ 7-094772

[51] Int. Cl.$^6$ .................................................. G08G 1/123
[52] U.S. Cl. ........................... 340/995; 340/990; 340/988; 701/200; 701/202; 701/212
[58] Field of Search ..................................... 340/974, 995, 340/989, 990; 364/443, 444.2, 449.6; 701/200, 202, 212

[56] References Cited

U.S. PATENT DOCUMENTS

| 5,115,398 | 5/1992 | De Jong .................................. 364/443 |
| 5,161,886 | 11/1992 | De Jong et al. ........................ 340/995 |
| 5,297,051 | 3/1994 | Arakawa et al. ....................... 340/995 |
| 5,299,300 | 3/1994 | Femal et al. ............................. 395/128 |
| 5,412,573 | 5/1995 | Barnea et al. ........................... 701/211 |
| 5,420,582 | 5/1995 | Kubbat et al. ........................... 340/974 |
| 5,566,073 | 10/1996 | Margolin ................................. 340/995 |
| 5,748,109 | 5/1998 | Kosaka et al. .......................... 340/995 |

FOREIGN PATENT DOCUMENTS

| 1-263688 | 10/1989 | Japan . |
| A-2-244188 | 9/1990 | Japan . |
| 6-90041 | 11/1994 | Japan . |

OTHER PUBLICATIONS

Foley, van Dam, Feiner, Hughes *Computer Graphics*: Addison–Wesley Publishing Company pp. 111–127.

*Primary Examiner*—Benjamin C. Lee
*Attorney, Agent, or Firm*—Antonelli, Terry, Stout & Kraus, LLP

[57] ABSTRACT

A navigation apparatus for displaying most appropriately information such as character strings, routes, etc., when a map is displayed by bird's-eye view display. The navigation apparatus includes a portion for calculating the present position on the basis of information from sensors, a portion for executing perspective conversion operation for displaying a map by bird's-eye view display, a portion for disposing the present position or the present position and a position representing a destination at the most suitable positions, a portion for controlling so that overlap of character strings can be eliminated, a portion for controlling the same character strings, a portion for displaying most appropriately a background such as lines and planes, a portion for controlling marks to be displayed, and a portion for executing graphic plotting by using the resulting map data.

30 Claims, 40 Drawing Sheets

BIRD'S-EYE VIEW MAP DISPLAY

STEP 1

PLOTTED REGION

⬇ CLIP PROCESSING

STEP 2

⬇ AFFIN CONVERSION
  + PERSPECTIVE CONVERSION

STEP 3

⬇ CLIP PROCESSING

STEP 4

⬇ PLOTTING PROCESSING

PERSPECTIVE CONVERSION CALCULATION

PLANE DATA PLOTTING PROCESSING

LINE DATA PLOTTING PROCESSING

FIG. 14 CHARACTER DATA PLOTTING PROCESSING
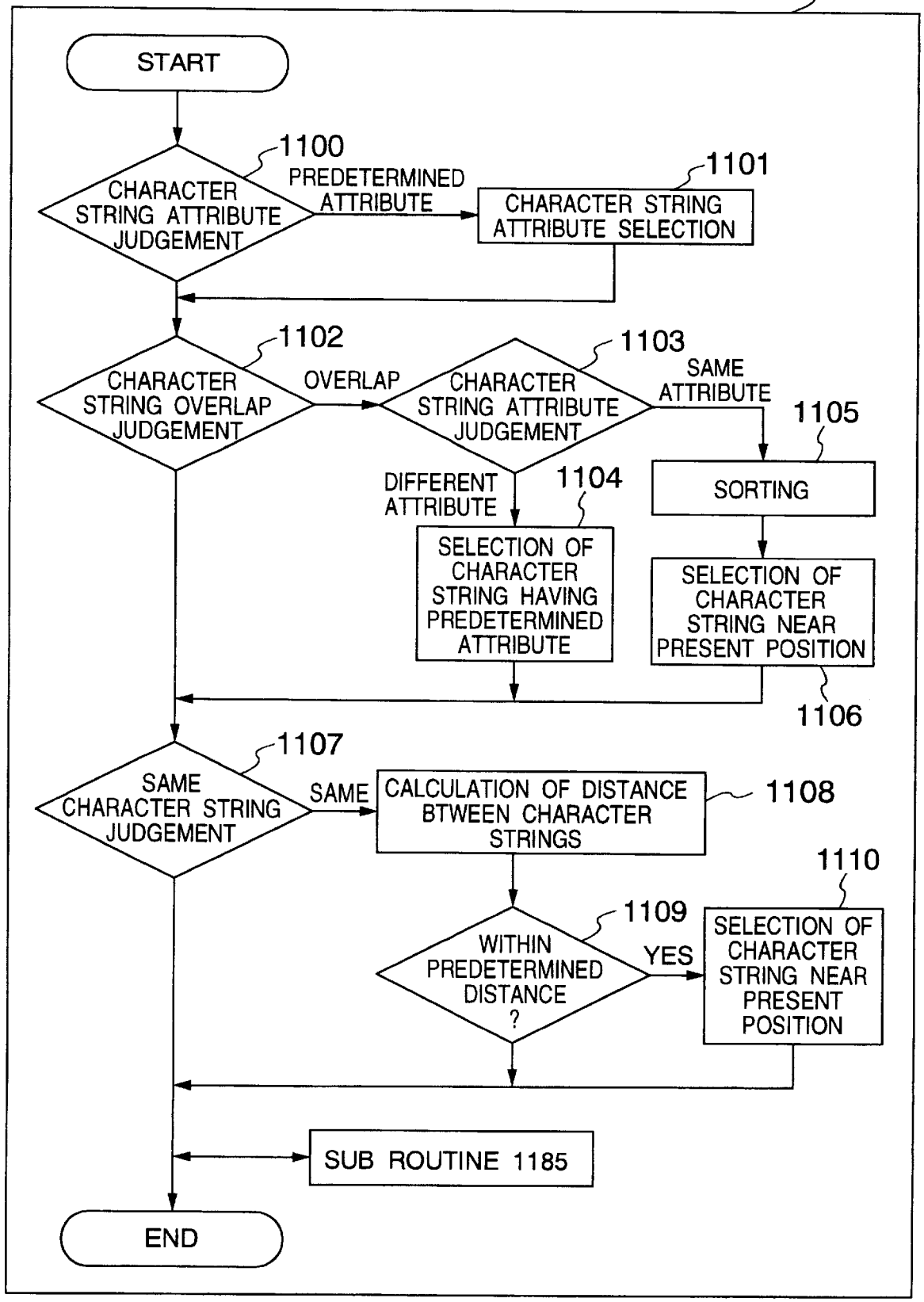

FIG.16A

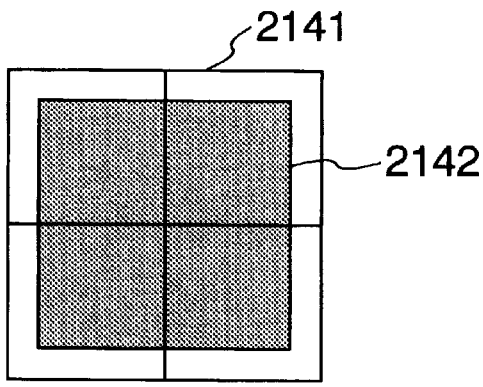

EXAMPLE OF EXPRESSING ONE CHARACTER BY PLURAL CHARACTER

FIG.16B

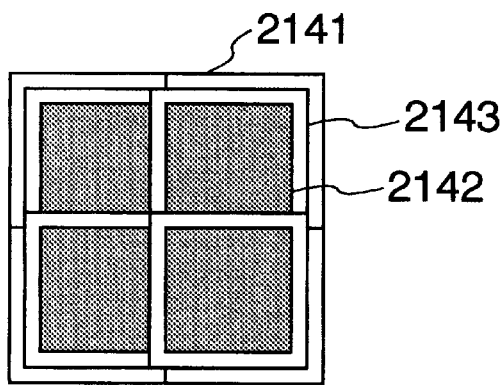

EXAMPLE OF FRINGING OF CHARACTER EXPRESSING ONE CHARACTER BY PLURAL CHARACTERS

FIG.16C

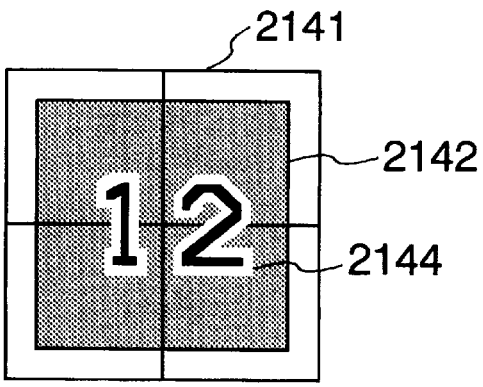

EXAMPLE OF DISPLAY OF FRINGED CHARACTER IN SUPERPOSITION WITH CHARACTER EXPRESSED BY PLURAL CHARACTERS

FIG.16D

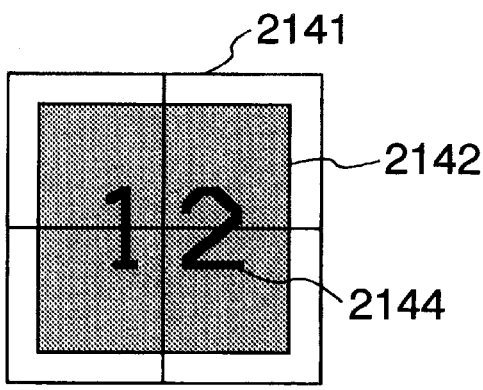

EXAMPLE OF CONTROL SO THAT CHARACTER WHICH OVERLAPS WITH CHARACTER EXPRESSED BY PLURAL CHARACTERS AND IS DESIGNATED TO BE FRINGED IS NOT FRINGED

CLIP PROCESSING SYSTEM IN STANDARD CHARACTER

CLIP PROCESSING SYSTEM IN HALF-SIZE CHARACTER

FIG. 18A

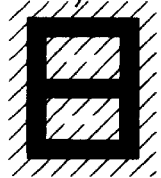

■ PLOTTING COLOR

▨ BACKGROUND COLOR

FRINGED CHARACTER OF "日"

FIG. 18B
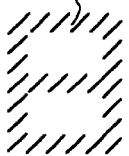

PLOTTING IN BACKGROUND COLOR AT POSITION DEVIATED BY ONE DOT TO UPWARD LEFT

FIG. 18C

PLOTTING IN BACKGROUND COLOR AT POSITION DEVIATED BY ONE DOT TO UP

FIG. 18D

PLOTTING IN BACKGROUND COLOR AT POSITION DEVIATED BY ONE DOT TO UPWARD RIGHT

FIG. 18E
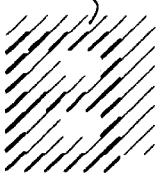

PLOTTING IN BACKGROUND COLOR AT POSITION DEVIATED BY ONE DOT TO LEFT

FIG. 18F
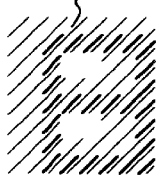

PLOTTING IN BACKGROUND COLOR AT POSITION DEVIATED BY ONE DOT TO RIGHT

FIG. 18G

PLOTTING IN BACKGROUND COLOR AT POSITION DEVIATED BY ONE DOT TO DOWNWARD LEFT

FIG. 18H
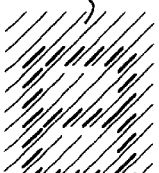

PLOTTING IN BACKGROUND COLOR AT POSITION DEVIATED BY ONE DOT TO DOWN

FIG. 18I
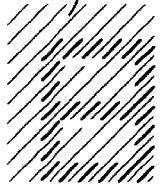

PLOTTING IN BACKGROUND COLOR AT POSITION DEVIATED BY ONE DOT TO DOWNWARD LEFT

FIG. 18J
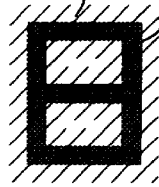

PLOTTING FINALLY IN PLOTTING COLOR

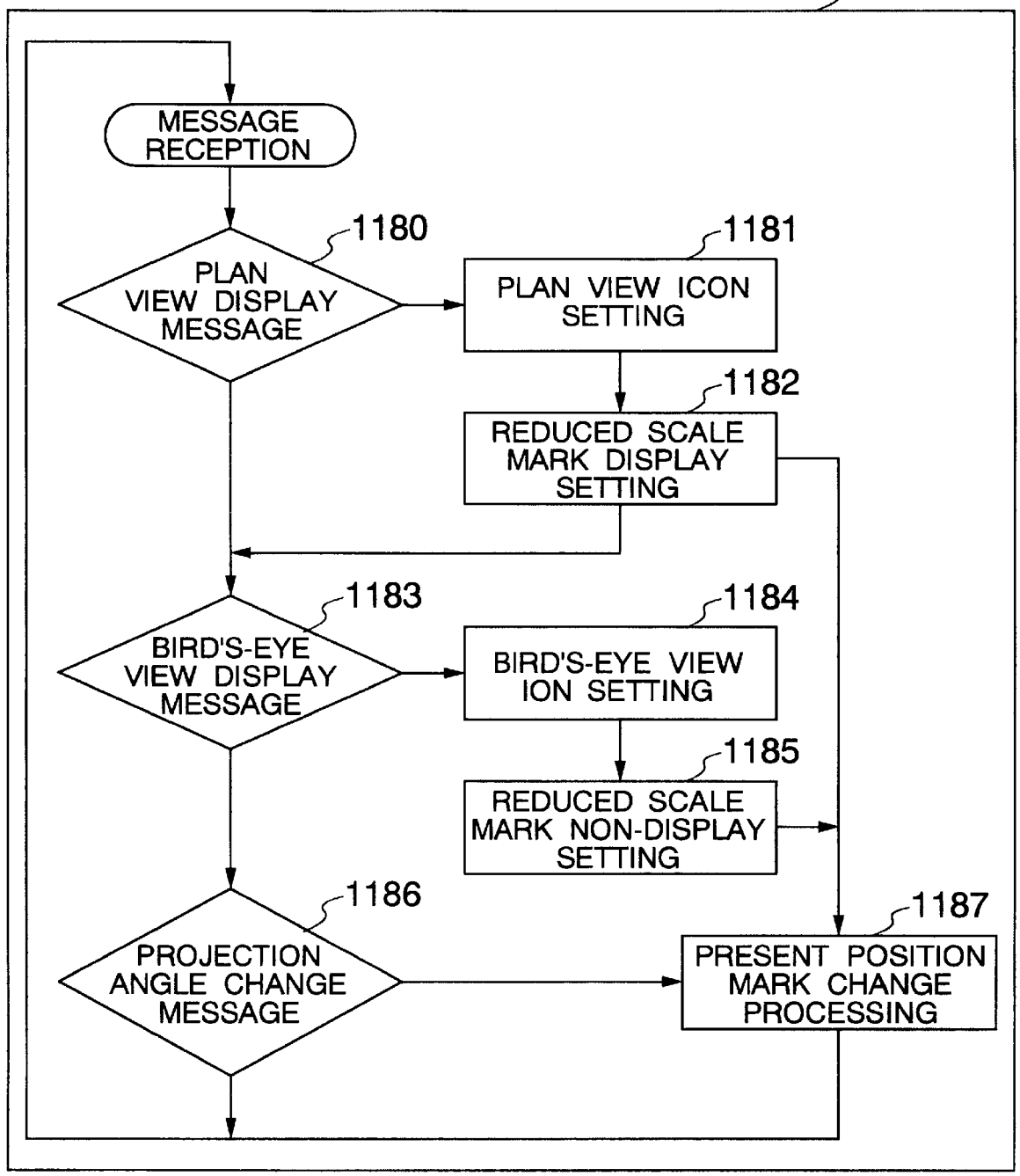

REGION DISPLAYED ON BIRD'S-EYE VIEW

VISUAL POINT AND PROJECTION PLANE

RESULTING BIRD'S-EYE VIEW DISPLAY

REGION DISPLAYED ON BIRD'S-EYE VIEW

VISUAL POINT AND PROJECTION ANGLE

RESULTING BIRD'S-EYE VIEW DISPLAY

EXAMPLE BEFORE PROCESSING $x2 \quad x1$
$\Delta x$

EXAMPLE AFTER PROCESSING

EXAMPLE OF CHARACTER STRINGS

CHARACTER STRING A

EXAMPLE OF CHARACTER STRINGS

CHARACTER STRING B

POLYGON CIRCUMSCRIBED WHIT CHARACTER STRING

CHARACTER STRING A

OVERLAP JUDGMENT REGION

POLYGON CIRCUMSCRIBED WHIT CHARACTER STRING

CHARACTER STRING B

OVERLAP JUDGMENT REGION

FIG.28A
EXAMPLE OF JUDGEMENT OF
OVERLAPPING CHARACTER STRINGS
KAWAKOHARA
KAISUIYOKUJO
KENKOHOKEN
CENTER
FIG.28B
EXAMPLE OF JUDGEMENT OF
OVERLAPPING CHARACTER STRINGS
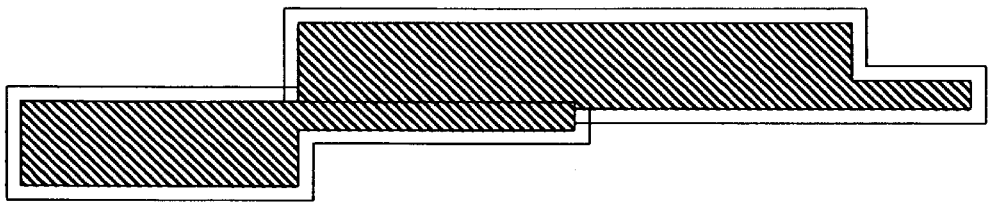
FIG.29A
EXAMPLE OF JUDGEMENT OF
NON-OVERLAPPING CHARACTER STRINGS
KAWAKOHARA
KAISUIYOKUJO
KENKOHOKEN
CENTER
FIG.29B
EXAMPLE OF JUDGEMENT OF
NON-OVERLAPPING CHARACTER STRINGS
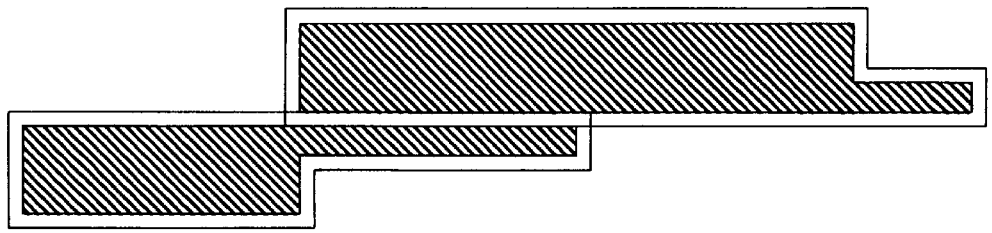

FIG.30A
EXAMPLE OF CHARACTER STRINGS
CHARACTER STRING A
KAWAKOHARA
KAISUIYOKUJO
FIG.30B
EXAMPLE OF CHARACTER STRINGS
CHARACTER STRING B
KENKOHOKEN
CENTER
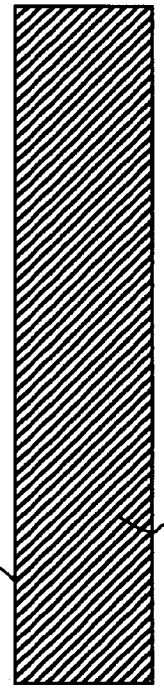
FIG.31B
POLYGON CIRCUMSCRIBED WITH CHARACTER STRING
CHARACTER STRING B
OVERLAP JUDGMENT REGION
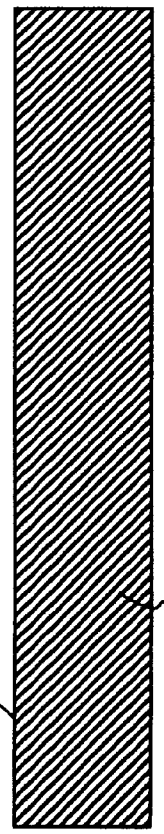
FIG.31A
POLYGON CIRCUMSCRIBED WITH CHARACTER STRING
CHARACTER STRING A
OVERLAP JUDGMENT REGION

FIG.32A
EXAMPLE OF JUDGEMENT OF
OVERLAPPING CHARACTER STRINGS
KAWAKOHARA
KENKOHOKEN KAISUIYOKUJO
CENTER
FIG.32B
EXAMPLE OF JUDGEMENT OF
OVERLAPPING CHARACTER STRINGS
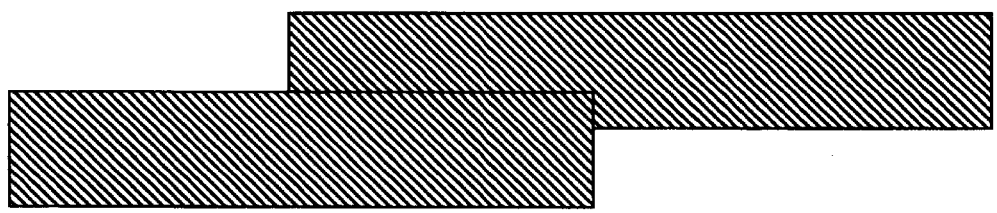
FIG.33A
EXAMPLE OF JUDGEMENT OF
NON - OVERLAPPING CHARACTER STRINGS
KAWAKOHARA
KAISUIYOKUJO
KENKOHOKEN
CENTER
FIG.33B
EXAMPLE OF JUDGEMENT OF
NON - OVERLAPPING CHARACTER STRINGS
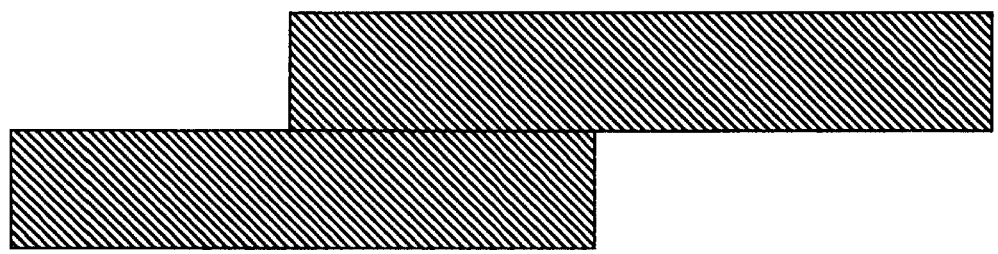

EXAMPLE OF CHARACTER STRINGS

EXAMPLE OF CHARACTER STRINGS

POLYGON CIRCUMSCRIBED WHIT CHARACTER STRING

POLYGON CIRCUMSCRIBED WHIT CHARACTER STRING

FIG.36A
EXAMPLE OF JUDGEMENT OF
OVERLAPPING CHARACTER STRINGS
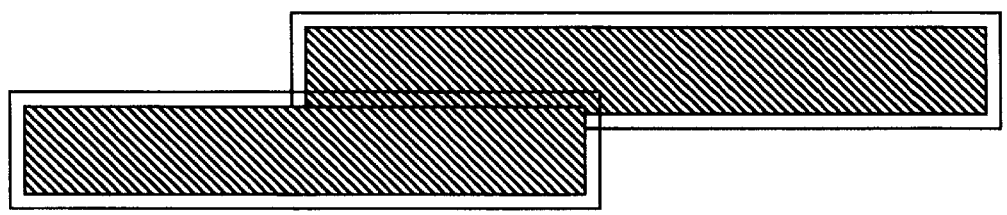
FIG.36B
EXAMPLE OF JUDGEMENT OF
OVERLAPPING CHARACTER STRINGS
FIG.37A
EXAMPLE OF JUDGEMENT OF
NON - OVERLAPPING CHARACTER STRINGS
K A W A K O H A R A
K A I S U I Y O K U J O
K E N K O H O K E N
C E N T E R
FIG.37B
EXAMPLE OF JUDGEMENT OF
NON - OVERLAPPING CHARACTER STRINGS
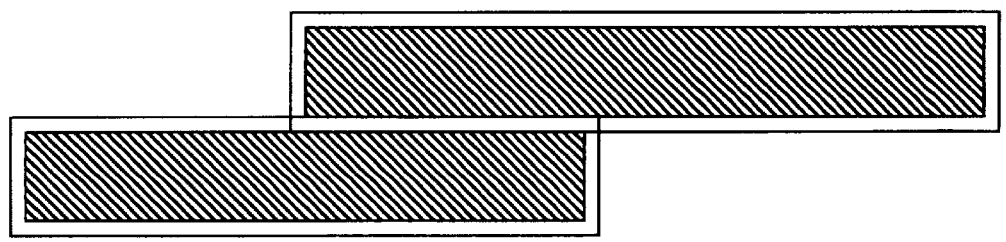

INITIAL STATE

SELECT CHARACTER STRING HAVING PREDETERMINED ATTRIBUTE

SELECT CHARACTER STRING NEAR PRESENT POSITION

INITIAL STATE

PRESENT POSITION

SUBSTITUTION TO SMALL FONTS

PRESENT POSITION

INITIAL STATE

CALCULATION OF DISTANCE BETWEEN SAME CHARACTER STRINGS

SELECT CHARACTER STRING NEAR PRESENT POSITION

PLOTTING OF POLYGON AND LINE HAVING
PATTERNS ACCORDING TO PRIOR ART

PLOTTING OF POLYGON AND
LINE HAVING SPEED - UP PATTERN

PLOTTING OF POLYGON AND
LINE HAVING SPEED - UP PATTERN

FIG.42A EXAMPLE OF ROUTE DISPLAY ACCORDING TO PRIOR ART SYSTEM
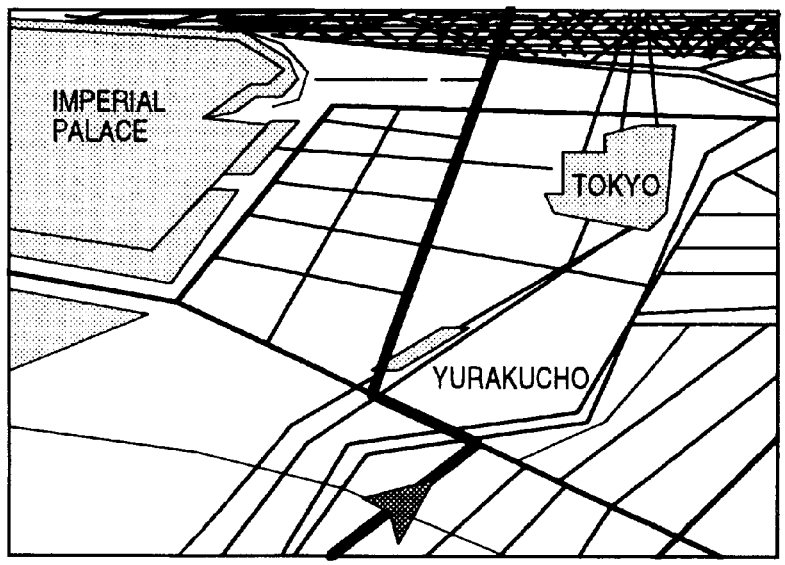
FIG.42B
EXAMPLE OF ROUTE DISPLAY BY PRESENT SYSTEM
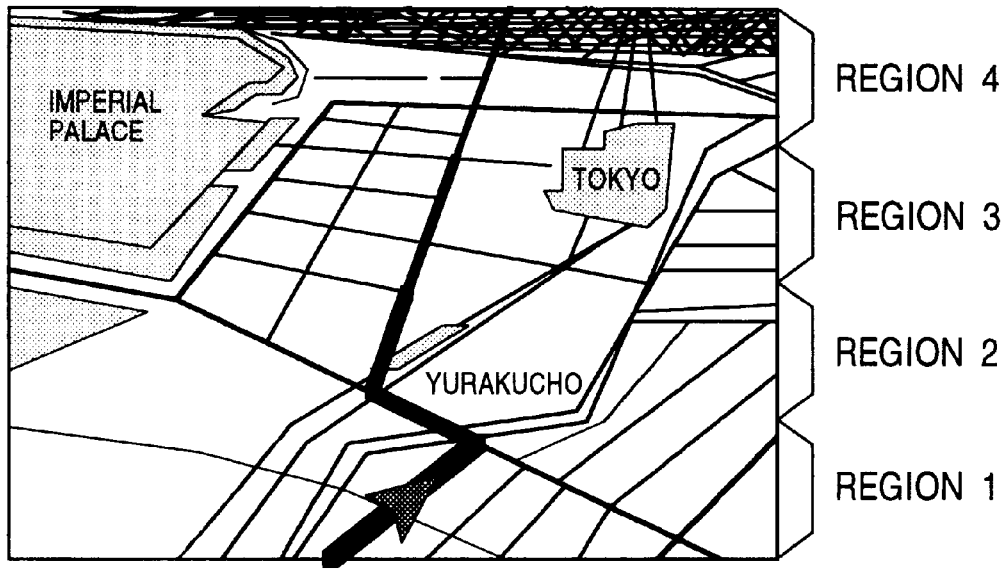

EXAMPLE OF ORBIT DISPLAY ACCORDING TO PRIOR ART SYSTEM

EXAMPLE OF ORBIT DISPLAY BY PRESENT SYSTEM

DISPLAY EXAMPLE OF BIRD'S-EYE VIEW MAP
ACCORDING TO PRIOR ART SYSTEM

DISPLAY EXAMPLE OF BIRD'S-EYE VIEW MAP
WHEN ARTIFICIAL BACKGROUND IS DISPLAYED

ICON DISPLAY EXAMPLE IN PLAN VIEW MAP

ICON DISPLAY EXAMPLE IN BIRD'S-EYE VIEW MAP

BIRD'S-EYE VIEW MAP WHEN PROJECTION ANGLE
IS SET SO AS TO DISPLAY DEEP REGIONS

PRESENT POSITION MARK

BIRD'S-EYE VIEW MAP WHEN PROJECTION ANGLE
IS SET SO AS TO DISPLAY FOREGROUND REGIONS

PRESENT POSITION MARK

MAP DISPLAY APPARATUS

BACKGROUND OF THE INVENTION

This invention relates to a map display apparatus for use in a navigation system for measuring the position of a mobile body and reporting the present position to a user, and more specifically to a bird's-eye view map display apparatus which provides a map in a more comprehensible way to the user.

A navigation apparatus mounted to a mobile body processes information from a variety of sensors to measure the position of the mobile body and reports the position to a user. This navigation apparatus comprises position measurement means for measuring the absolute position of a mobile body, memory means for storing map data constituted by two-dimensional vector data obtained by projecting points on the ground such as roads and buildings on a plane divided into meshes by universal transverse mercator projection and character data accompanying the two-dimensional vector data, input means for receiving commands from the user, and display means for reading the necessary vector data from the map mesh stored in the memory means in accordance with the command inputted from the input means and conversion processing the data to display the map on a display Here, data conversion processing includes movement conversion for changing the display position of the map, reduced scale conversion, such as enlargement and reduction, used for displaying the map in an arbitrary reduced scale and rotation conversion for changing the displaying direction of the map. By means of these processings, a plan view map depicting the ground surface directly overhead by normal projection is displayed on the display.

In navigation apparatuses, according to the prior arts plan view map display which depicts a map by normal projection directly overhead has been employed to display the map. When two points spaced apart from each other are simultaneously displayed, therefore, a reduced scale becomes unavoidably great and detailed information cannot be displayed. One of the means for solving this problem is a bird's-eye view display system which displays a map when points having a certain height from the ground surface are looked down obliquely from afar on a plane. In order to apply this bird's-eye view display to the navigation apparatuses, the following problems must be solved.

First, in the case of the bird's-eye view display which displays a broader range of regions than the plan view map, a reduced scale becomes great at points far from the start point, so that a greater quantity of information is displayed. According to the prior art systems, character strings of those regions in which the reduced scale becomes great are not displayed or the character strings in the proximity of a visual point are merely displayed at the upper part. For this reason, fall-off of characters and overlap of character strings are unavoidable, and recognizability of the characters by the user drops.

Secondly, background data and character data are constituted in the map data base so that display quality attains the highest level when the plan view map is displayed. Therefore, in the bird's-eye view map display displaying a broader range of regions, the frequency of the occurrence that the same character strings are displayed at a plurality of positions becomes higher. Since no counter-measure has been taken in the past for the same character strings the same character string is unnecessarily displayed and this unnecessary character string hides the roads and other background data. In consequence, display quality gets deteriorated.

Thirdly, though a route to the destination is displayed in superposition with the map in a different color from those of the background roads, all the route data are displayed with the same line width in the past because the concept of the road width does not exist in the vector data expressing the routes. However, because the map is expressed three-dimensionally in the bird's-eye view display, the feel of three-dimensional depth will be lost if all the routes are displayed by the same line width.

In the fourth place, in the display of a driving orbit, it has been customary in the prior art to store the position information of driving in a certain distance interval and to display the points representing the driving orbit on the basis of the position information so stored. When the driving orbit is displayed by the method of the prior art system on the bird's-eye view map, however, the gap of the point strings representing the orbit is enlarged in the proximity of the visual point at which the reduced scale becomes small, and the user cannot easily recognize which route he has taken The gap of the dot strings becomes unnecessary narrow, on the contrary, at portions away from the visual point at which the reduced scale becomes great, and the roads and the character strings as the background information are hidden. Therefore, the user cannot easily recognize the map information, either.

In the fifth place, pattern information, e.g. solid lines and dash lines, used for displaying the vector information such as roads, railways, administrative districts, etc., and pattern information, e.g. check and checkered patterns, used for displaying polygons representing water systems, green zones, etch, are registered to the map data base. When the map containing these pattern information is displayed by bird's-eye view, the prior art systems execute not only perspective conversion of each apex coordinates constituting the lines and the polygons but also perspective conversion of the patterns for displaying the map. Therefore, the processing time becomes enormously long, and the time required for bird's-eye map display gets elongated.

In the sixth place, in order to prevent dispersion of the map data displayed near an infinite remote point called a "disappearing point" in the bird's-eye map display, the display region is limited to the foreground region by a predetermined distance from the disappearing point and artificial background information such as virtual horizontal line and sky are displayed at the depth in the prior art system. However, these artificial background information in the prior art systems have fixed patterns or fixed colors and do not match the surrounding conditions.

In the seventh place, when the bird's-eye view map display and the plan view map display are switched, the user cannot easily discriminate which of them is actually displayed when the number of objects plotted is small. Moreover, the user can operate and change the position of the visual point in the bird's-eye view map display, and the map region actually displayed greatly changes depending on the position of the visual point and on the direction of the visual field. In the prior art systems, however, there is no means for providing the information of the position of the visual point, etc., even when the position of the visual point and the direction of the visual field are changed, and the systems are not easy to handle.

In the eighth place, when the bird's-eye view map is displayed, the map displaying direction is set in such a manner that the image display direction coincides with the driving direction, as described, for examples in JP-A-2-244188. When the destination is set, the driving direction and the direction of the destination are not always coincident, so that the destination disappears from the screen Accordingly, there remains the problem that the user cannot recognize the map while always confirming the direction of the destination.

In the conventional bird's-eye view map displays in the ninth place, even when a map information density is low in a certain specific direction or when a specific direction comprises only information having specific attributes, the display position of the visual point, that is, the display position of the present position, does not change on the screen. In other words, there occurs the case where a large quantity of information, which are not much significant, are displayed on the display region having a limited area, and the information cannot be provided efficiently.

SUMMARY OF THE INVENTION

To solve the first problem, the present invention uses means for judging whether or not overlap occurs between character strings or symbols, and selecting and displaying character strings or symbols having predetermined attributes when overlap exists, or selecting and displaying character strings or symbols in the proximity of the visual point, or replacing the overlapping character strings or symbols by a font size smaller than the recommended font size. The character overlap judgement means uses means for judging that the character strings overlap by using rectangular region information circumscribed with the character strings when the mutual circumscribed rectangular regions overlap, or judges that the character strings overlap by using rectangular region information of rectangles positioned more inside by a predetermined distance from the rectangles circumscribed with the character strings when mutual rectangle regions overlap.

To solve the second problem, the present invention uses means for judging whether or not the same character strings or symbols exist inside the screen displaying a certain bird's-eye view map, and selecting and displaying character strings in the proximity of the visual point when the same character string or symbol exists. It is effective to display both the character strings or symbols if the mutual distance is great even when the same character strings or symbols exist. Accordingly, the present invention uses means for selecting and displaying character strings in the proximity of the visual point when the distance between the same character strings or symbols or the distance between them in the bird's-eye view map display is judged as existing within a predetermined range, and for displaying both of the character strings or the symbols when the distance is judged as existing outside the range.

To solve the third problems the present invention uses means for displaying routes in the proximity of the visual point by thicker lines than routes apart from the visual point when the routes are displayed on the bird's-eye view map. Alternatively, the present invention uses means for dividing the bird's-eye view map into a plurality of regions and displaying routes by a line width inherent to ach region when the routes to be displayed in superposition in these regions are displayed.

To solve the fourth problem, the present invention uses means for obtaining an orbit which supplements the stored orbit information for the driving routes in the proximity of the visual point, and displaying the orbit in superposition with the bird's-eye view map. As to driving orbits away from the visual point, on the other hand, the present invention uses means for thinning out the stored orbit information and displaying the orbits so thinned out in superposition on the bird's-eye view map.

To solve the fifth problem, the present invention uses means for executing perspective conversion the lines constituting the map data and each apex coordinates constituting polygons, and displaying the polygons or the lines by using the patterns used for plan view map display by using the coordinates values after perspective conversion.

To solve the sixth problem, the present invention uses means for limiting display of the map in the foreground regions by a predetermined distance from the disappearing point and changing the colors and patterns of the artificial background such as the horizontal line and the sky to be displayed at the depth. More concretely, the present invention uses means for changing the colors and the patterns of the artificial background information by a blue color representing the sky when lamps are not lit and by a black or grey color when the lamps are lit, by using signals representing the condition of the car, that is, light turn ON/OFF signal of the car.

To solve the seventh problem the present invention uses means for causing a map display control portion to switch the bird's-eye view map and the plan view map in accordance with a user's request, and causing a menu display portion, which displays a mark in superposition with the map, to receive the change of the display state of the map and to display the mark representing the plan view map in superposition with the map when the map is switched from the bird's-eye view map to the plan view map. When the map is switched from the plan view map to the bird's-eye view maps the mark representing the bird's-eye view map is displayed in superposition with the map. When the user changes the position of the visual point during the display of the bird's-eye view map, the shape of the mark representing the present position is changed and is displayed in superposition with the map.

To solve the eighth problem, the present invention promotes the user to set the destination. After setting of the destination is completed, the direction of the visual point is brought into conformity with the direction of the destination from the position of the visual point, and the position/direction of the visual point and the projection angle are calculated so that the map of predetermined regions is displayed by the bird's-eye view map. Even when the present position is updated, the processing described above is always executed repeatedly to bring the position of the visual point into conformity with the present position and to display the bird's-eye view map.

To solve the ninth problem, a region inside the bird's-eye view map, which has a low map information density, and a region constituted by information having only specific attributes are retrieved. When these regions are retrieved, the position of the visual point is changed so that the region having a low map information density and the region comprising only the information of the specific attributes do not occupy a large area on the display screen. The bird's-eye view map is displayed by using the information of the position of the visual point and the projection angle so obtained.

When overlap exists between the character strings in the bird's-eye view map display, the first means displays one of them, or displays the overlapping character strings by changing their size to the smaller fonts.

When the same character strings or symbols exist in the bird's-eye view map display, the second means selects and displays the character strings closer to the visual point.

In the bird's-eye view map display, the third means so functions as to display the guiding route near the visual point by a greater line width than the guide routes existing away from the visual point.

In the bird's-eye view map display, the fourth means so functions as to display the dot strings representing the driving orbit with suitable gaps between the region near the visual point and the region far from the visual point.

In the bird's-eye view map display, the fifth means so functions as to speed up the display of pattern lines and polygons in which patterns exist.

In the bird's-eye view map display, the sixth means so functions as to display the artificial background in different colors and different patterns in accordance with the condition of the car.

In the bird's-eye view map display, when the bird's-eye view map and the plan view map are mutually switched, the seventh means so functions as to change the shape of the mark to be displayed in superposition with the map in the direction of the position of the visual point and the visual field.

In the bird's-eye view map display, the ninth means so functions as to reduce the occupying area of the regions having a low map information density or comprising only information of specific attributes.

BRIEF DESCRIPTION OF THE DRAWINGS

FIG. 14 is a flowchart of character string display in bird's-eye view map display;

FIGS. 16A, 16B, 16C and 16D show an embodiment for character fringing display for representing one character by a plurality of characters;

FIGS. 18A to 18J show an embodiment for display means of a fringed character;

FIG. 22 is a flowchart of mark display in bird's-eye view map display;

FIGS. 26A, 26B, 27A, 27B, 28A, 28B, 29A and 29B show an embodiment for character string overlap judgement in bird's-eye view map display;

FIGS. 30A, 30B, 31A, 31B, 32A, 32B, 33A and 33B show an embodiment for character string overlap judgement in bird's-eye view map display;

FIGS. 34A, 34B, 35A, 35B, 36A, 36B, 37A and 37B show an embodiment for character string overlap judgement in bird's-eye view map display;

FIGS. 42A and 42B show an embodiment for route display in bird's-eye view map display;

DESCRIPTION OF THE PREFERRED EMBODIMENTS

Figure 1:
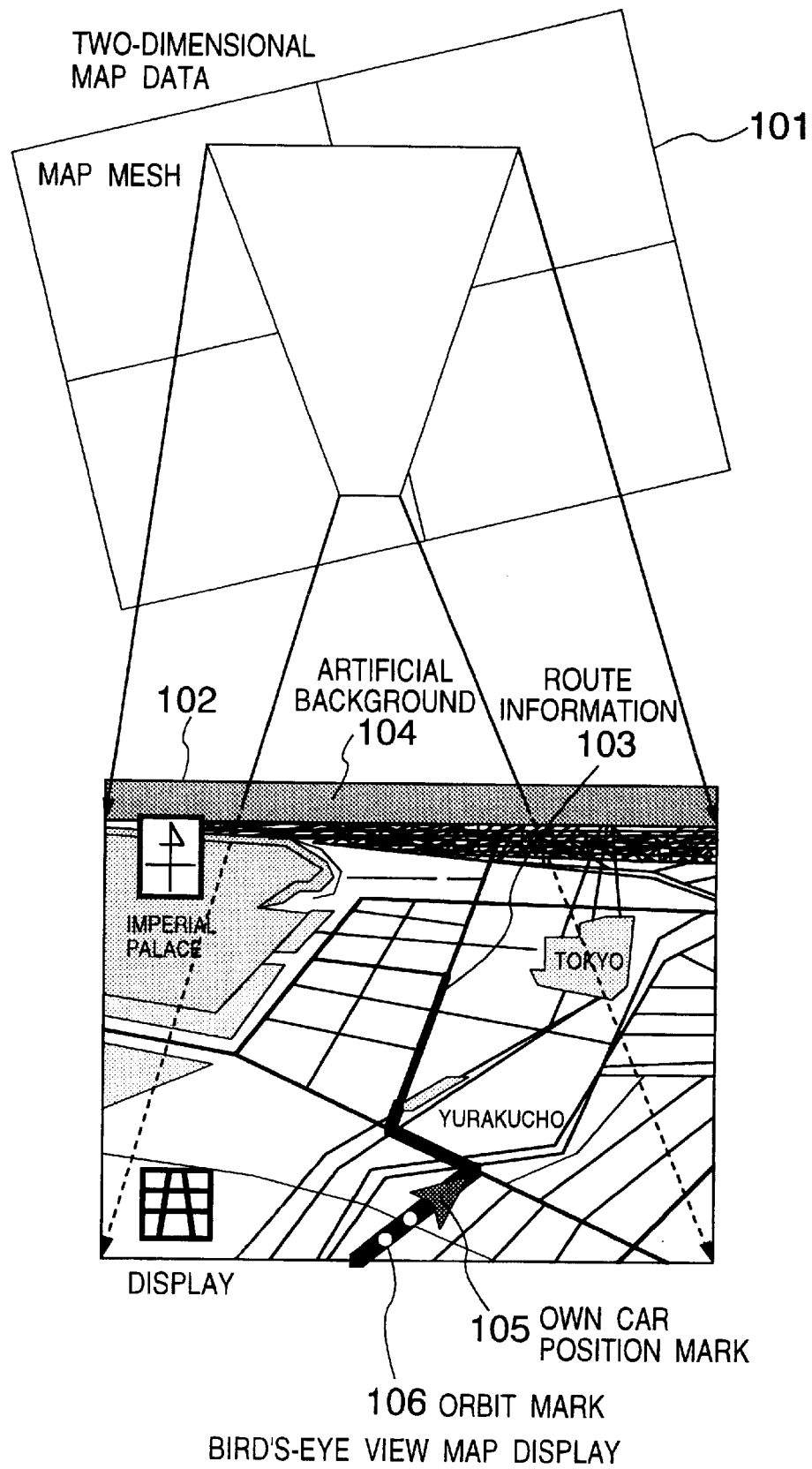
FIG. 1 shows a bird's-eye view map display according to an embodiment of the present invention.

FIG. 1 shows an example of the bird's-eye view map displayed by a bird's-eye view map display device mounted to a navigation system according to an embodiment of the invention. The bird's-eye view map display device according to this embodiment generates a bird's-eye view 102 showing a bird's-eye view from a specific position as a projection chart of two-dimensional map data (indicated by reference numeral 101 in FIG. 1), and displays it on a display screen of a display 2. Incidentally, in the bird's-eye view 102 shown in FIG. 1, a folded line 103 is provided with a thick line and is highlighted in order to represent a guiding route. An artificial background 104 represents the sky, a mark 105 represents the present position and an orbit mark 106 represents the orbit of a car so far driven. Further, arrows in FIG. 1 represent the relationship of projection from the two-dimensional map data 101 to the bird's-eye view 102.

The outline of bird's-eye view map display as the characterizing feature of the present invention will be explained with reference to FIG. 2.

In printed map charts or in the navigation systems according to the prior art, a map is represented by a plan map display obtained when a given area is viewed from an infinitely remote point above this area. Because this plan map display has the advantage that a reduced scale is constant irrespective of points inside the same display screen, the feel of distance is easy to grasp. When an area between certain two points is represented on the same screen, however, the operation for adjusting and optimizing the reduced scale of the map display becomes necessary, and if the distance between these two points is great, only limited information can be displayed because the quantity of information that can be displayed at one time is restricted by the size of the display used and the level of its precision. Bird's-eye view display is employed as means for solving this problem When this bird's-eye view display is used, the information of those portions which are close to the visual point is enlarged while the information of those remote from the visual point is reduced, as is obvious from FIG. 2. Therefore, when the area between certain two points is displayed on the same screen, the point for which more detailed information is required is situated close to the visual point with the other being remote from the visual point, and their mutual positional relationship is represented in an easily comprehensible form by displaying the two points on the same screen Further, a greater quantity of information can be provided to the user on the information near the visual point. This bird's-eye view display can be accomplished by effecting perspective conversion which projects two- or three-dimensional map information of a plane A to a plane B describing a certain angle Θ with the plane A. Since two-dimensional map data can be used as the map information used, bird's-eye view display is feasible by adding the perspective conversion function to existing navigation systems without adding new map data, but various contrivances must be made when the bird's-eye view display is put into practical use.

Figure 4:
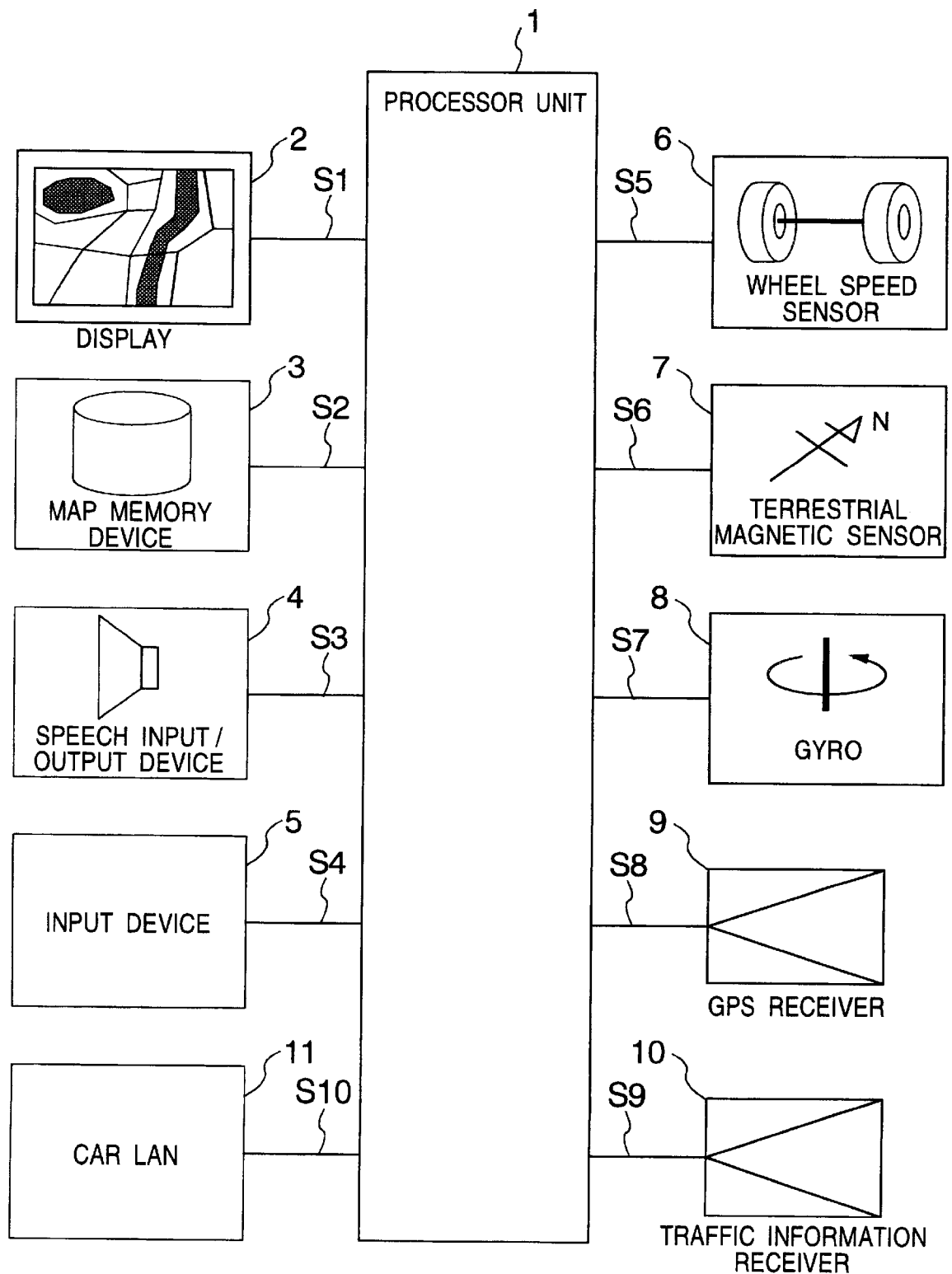
FIG. 4 is a structural view of a navigation apparatus according to an embodiment of the present invention.

FIG. 4 shows a structural example of a navigation apparatus for a mobile body to which the present invention is applied.

Figure 6:
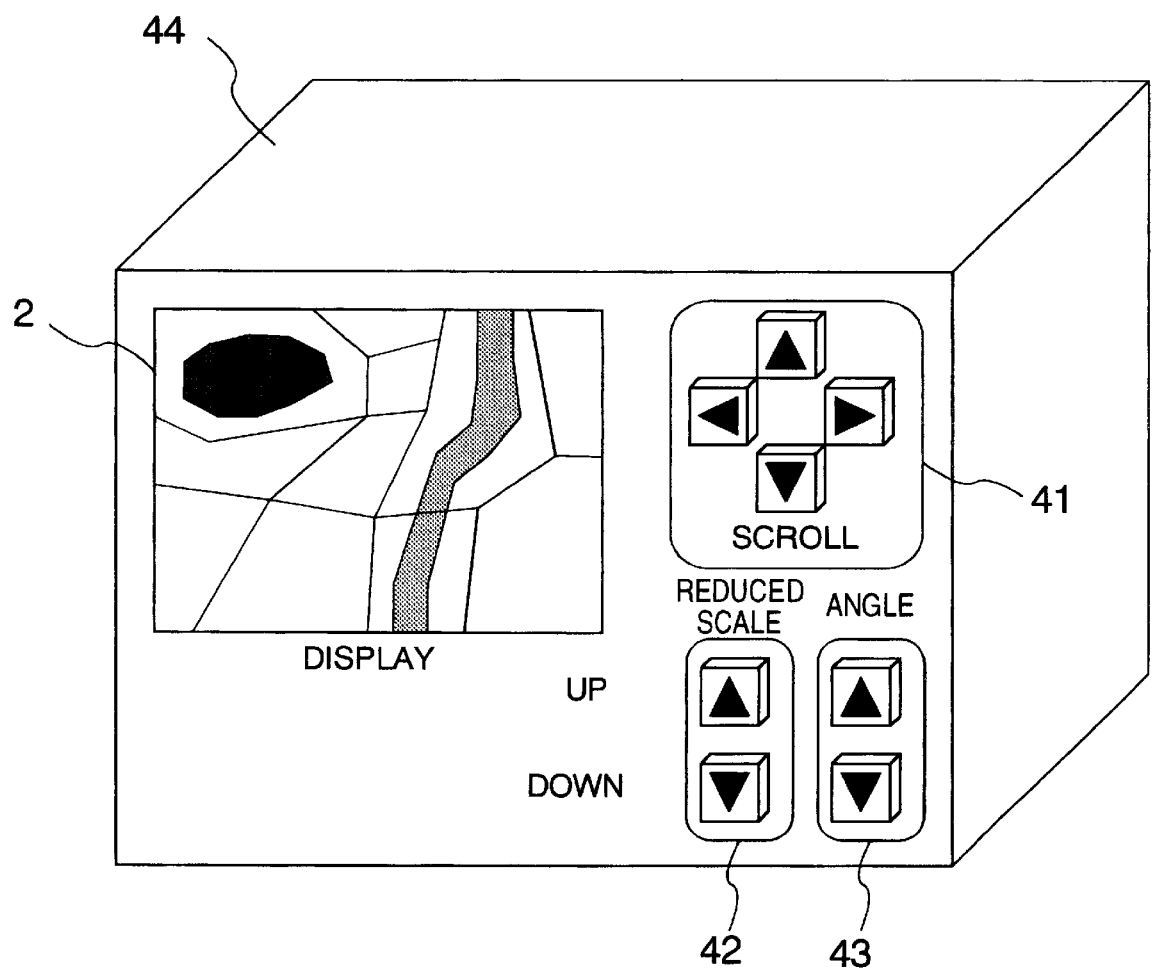
FIG. 6 is an explanatory view showing appearance of a navigation apparatus according to an embodiment of the present invention.

Hereinafter, each structural unit of this navigation apparatus will be explained. A processor unit 1 detects the present position on the basis of the information outputted from various sensors 6 to 9, reads the map information necessary for display from a map memory unit 3 on the basis of the present position information so detected, graphically expands the map data, displays this data on a display 2 by superposing a present position mark, selects an optimum route connecting the destination indicated by the user to the present position and guides the user by using a speech input/output device 4 or the display 2. In other words, it is a central unit for executing various processings. The display 2 is the unit which displays the graphic information generated by the processor unit 1, and comprises a CRT (Cathode-Ray Tube) or a liquid crystal display. A signal S1 between the processor unit and the display is generally connected by RBG signals or NTSC (National Television System Committee) signals. The map memory device 3 comprises a large capacity memory medium such as a CD-ROM or an IC card and executes read/write processing of the required map data The speech input/output device 4 converts the message to the user generated by the processor unit 1 to the speech signals, outputs theme recognizes the user's voice and transfers it to the processing unit 1. An input device 5 is the unit that accepts the user's instructions and comprises hard switches such as scroll keys 41, reduced scale keys 42 and angle changing keys 43 shown in FIG. 6, for examples a joystick, touch panels bonded on the displays or the like. The sensor used for detecting the position in the navigation system for a mobile body comprises a wheel speed sensor 6 for measuring the distance from the product of the circumference of a wheel and the number of revolution of the wheel and measuring a turning angle of the mobile body from the difference of the numbers of revolution of the wheels forming a pair, a terrestrial magnetic sensor 7 for detecting the magnetic field of the earth and detecting the moving direction of the mobile body, a gyro sensor 8 for detecting the turning angle of the mobile body such as an optical fiber gyro or an oscillation gyro, and a GPS receiver 9 for receiving signals from a GPS satellite, measuring the distance between the mobile body and the GPS satellite and the change ratio of this distance for at least three satellites and thus measuring the present position of the mobile body, its travelling direction and its course. The input device 5 further includes a traffic information receiver 10 for receiving signals from beacon transmitters that transmit traffic information such as road jamming information, closed-to-traffic information, parking lot information, etc., and from FM multiplex broadcasting. Furthermore, an internal LAN device 11 is provided so as to receive various information of the car such as door open/close information, the information on the kind and condition of lamps turned ON, the information of the engine condition, the information on the result of trouble-shooting, and so forth.

Figure 5:
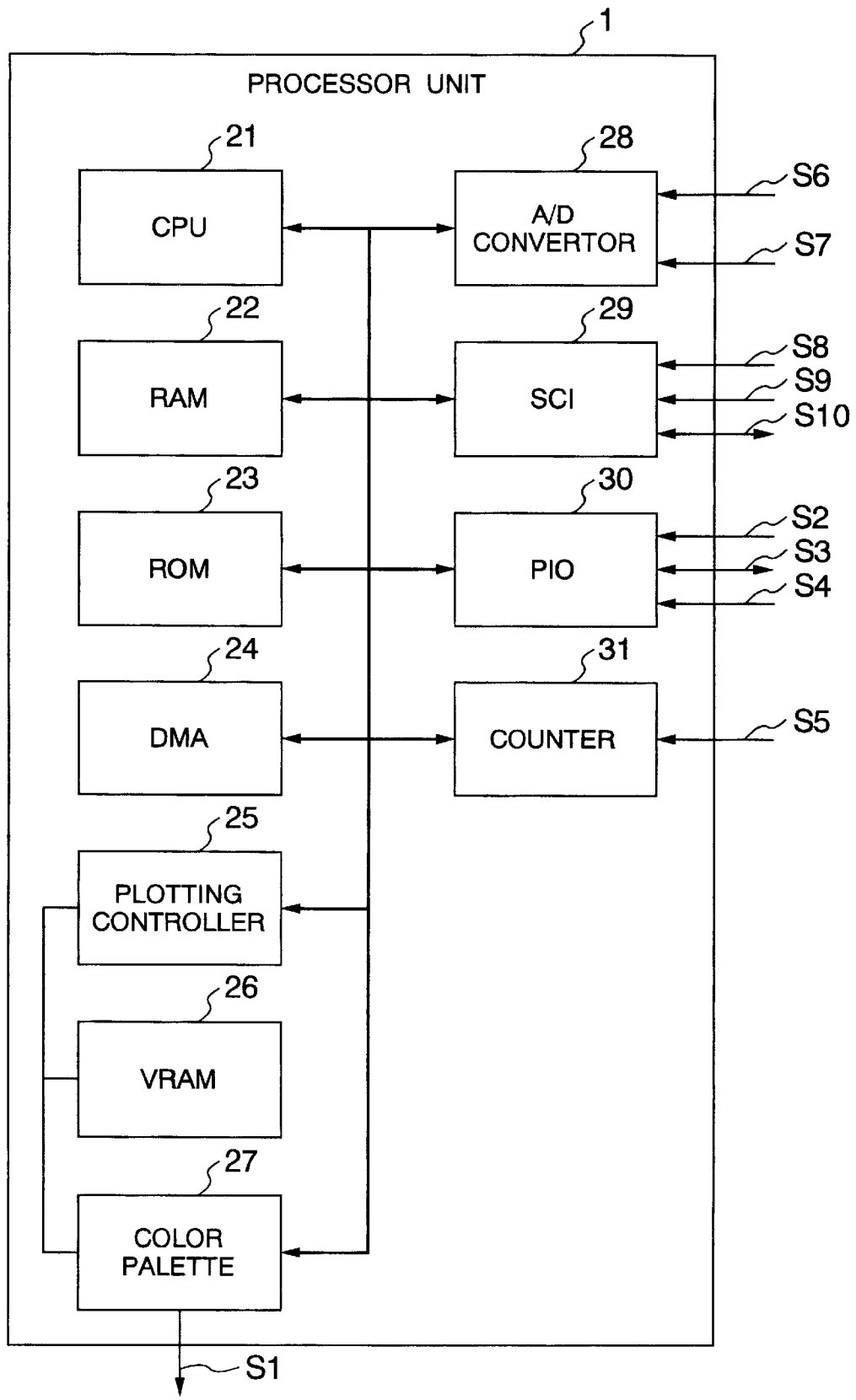
FIG. 5 is a hardware structural view of an arithmetic processing portion of the embodiment of the present invention.

FIG. 5 is an explanatory view showing the hardware construction of the processor unit.

Hereinafter, each constituent element will be explained. The processor unit 1 employs the construction wherein devices are connected by a bus. The devices include a CPU 21 for executing computation of numerical values and controlling each devices an RAM 22 for storing the map and the operation data, an ROM 23 for storing the program and the data, a DMA (Direct Memory Access) 24 for executing data transfer at a high speed between the memory and the memory and between the memory and each devices a plotting controller 25 for executing at a high speed graphic plotting such as expansion of vector data to pixel information, etc. and for executing display control, a VRAM 26 for storing graphic image data, a color palette 27 for converting the image data to the RGB signals, an A/D convertor 28 for converting analog signals to digital signals, an SCI 29 for converting serial signals to parallel signals in synchronism with the bus, a PIO 30 for establishing synchronism with the parallel signal and putting it on the buss and a counter 31 for integrating pulse signals.

Figure 7:
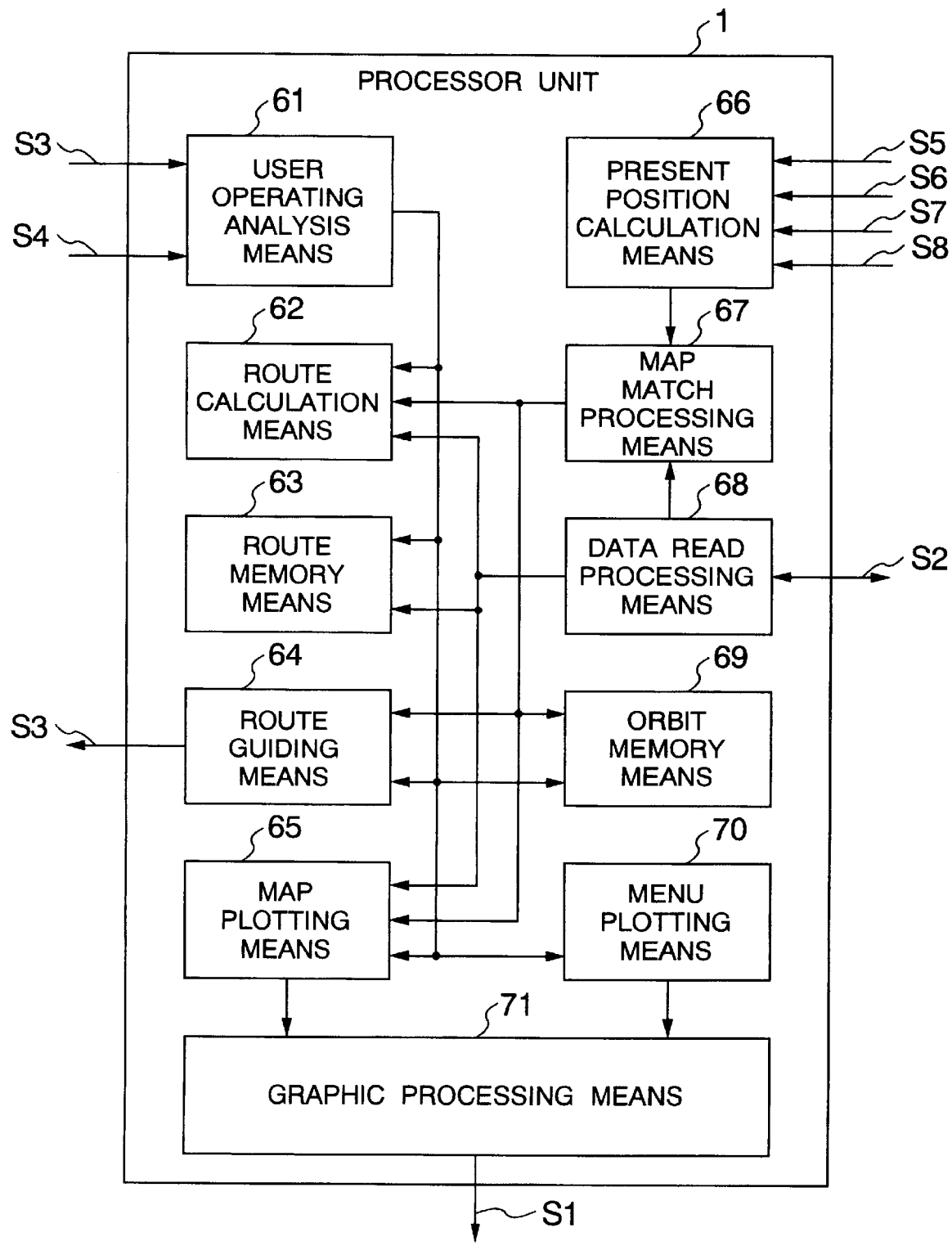
FIG. 7 is a functional structural view of an arithmetic processing portion for accomplishing bird's-eye view map display.

FIG. 7 is a explanatory view useful for explaining the functional construction of the processor unit 1.

Hereinafter, each constituent element will be explained Present position calculation means 66 integrates on the time axis the distance data and the angle data obtained by integrating the distance pulse data S5 measured by the wheel speed sensor 6 and the angular velocity data S7 measured by the gyro 8, respectively, and calculates the position (X', Y') after driving of the mobile body from the initial position (X, Y). In order to bring the rotating angle of the mobile body into conformity with the azimuth of driving, the azimuth data S6 obtained from the terrestrial magnetic sensor 7 and the angle data obtained by integrating the angular velocity data from the gyro 8 are mapped on the 1:1 basis, and the absolute azimuth of the driving direction of the mobile body is corrected. When the data obtained from the sensors described above are integrated on the time axis, the sensor errors accumulate. Therefore, a processing for canceling the errors so accumulated is executed in a certain time interval on the basis of the position data S8 obtained from the GPS receiver 9, and the present position information is outputted. Since the present position information acquired in this way contains the sensor errors, map-match processing 67 is executed so as to further improve positional accuracy. This is the processing which collates the road data contained in the map in the proximity of the present position read by the data read processing means 68 with the driving orbit obtained from the present position calculation means 66, and brings the present position to the road having the highest similarity of shape. When this map-match processing is executed, the present position coincides in most cases with the driving road, and the present position information can be accurately outputted. The present position information calculated in this way is stored in orbit memory means 69 whenever the mobile body drives in a predetermined distance. The orbit data is used for plotting an orbit mark on the road on the corresponding map for the road through which the mobile body has run so far.

On the other hand, user operation analysis means 61 accepts the request from the user by the input device 5, analyzes the content of the request and controls each unit so that a processing corresponding to the request can be executed When the user requests to guide the route to the destination, for example, it requires the map plotting means 65 to execute processing for displaying the map for setting the destination and further requests route calculation means 62 to execute processing for calculating the route from the present position to the destination The route calculation means 62 retrieves a node connecting between two designated points from the map data by a Dichistler method, etc., and stores the route so obtained in route memory means 63. At this time, it is possible to determine the route in which the distance between the two points is the shortest, the route through which the destination can be reached within the shortest time or the route through which the driving cost is the lowest. Route guiding means 64 compares the link information of the guide route stored in the route memory means 63 with the present position information obtained by the present position calculation means 66 and the map match processing means 67 and notifies to the user whether or not to drive straight or whether or not to turn right or left before passing by a crossing, etc., by the speech input/output device 4, displays the travelling direction on the map displayed on the display, and teaches the route to the user. Data read processing means 68 so operates as to prepare for reading the map data of the requested region from the map memory device 3. Map plotting means 65 receives the map data around the point for which display is requested from the data read processing means 68 and transfers the command for plotting the designated object in the reduced scale, the plotting direction and the plotting system that are designated, respectively, to graphic plotting means 71. On the other hand, menu plotting means 70 receives a command outputted from the user operation analysis means 61 and transfers a command for plotting various kinds of requested menus and marks to be displayed in overlap with the map to graphic processing means 71. The graphic processing means 71 receives the plotting commands generated by the map plotting means 65 and the menu plotting means 70, and expands the image on the VRAM 26.

Figure 8:
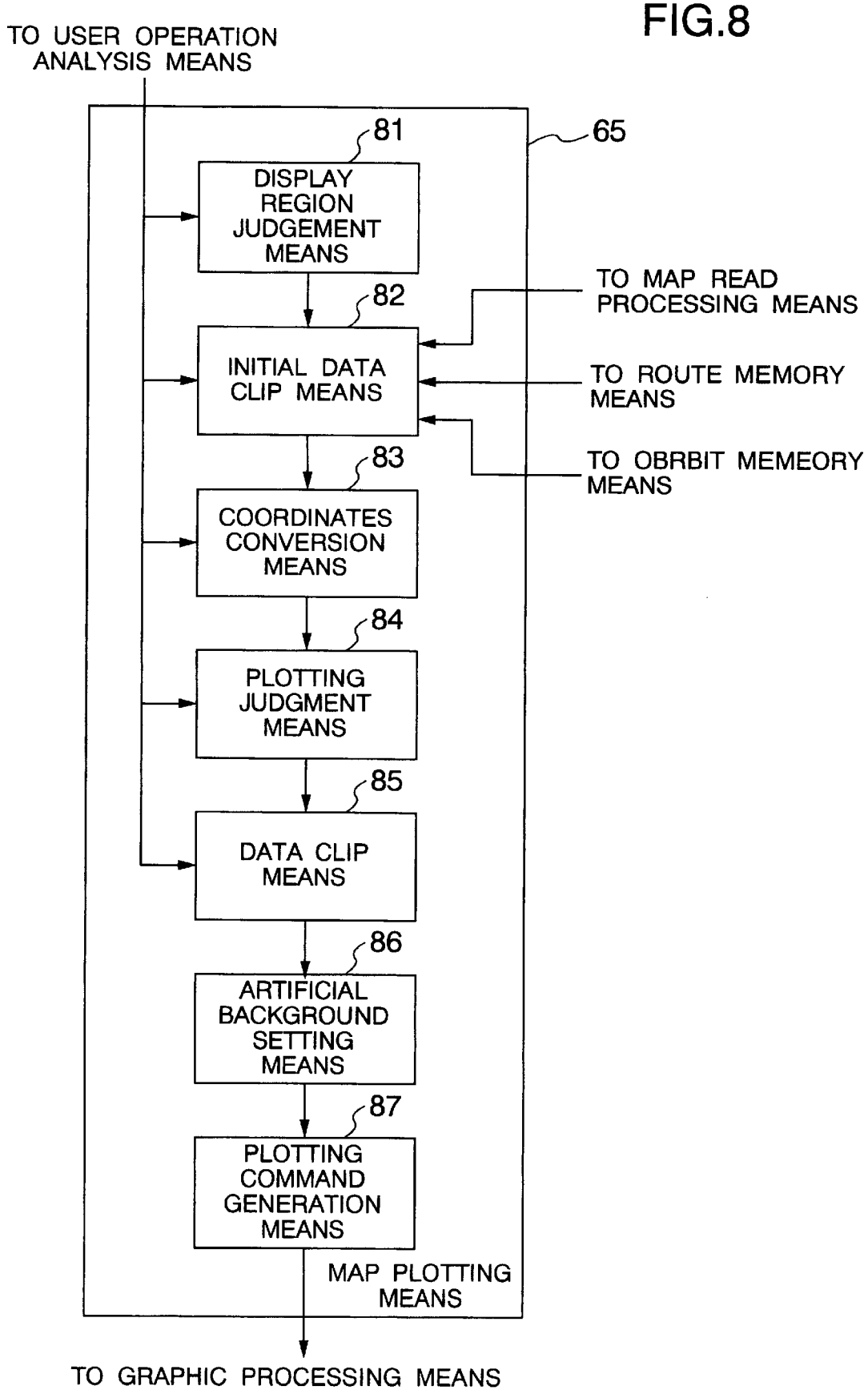
FIG. 8 is a flowchart of map plotting means for accomplishing bird's-eye view map display.

FIG. 8 is an explanatory view useful for explaining the functions of the map plotting means 65.

Hereinafter, each constituent element will be explained. Display region judgement means 81 decides the display reduced scale of the map and decides also which region should be displayed with which point of the map data as the center. Initial data clip means 82 selects, by clip processing, the data necessary for display from the line data, the plan data and the character data representing objects such as roads, buildings, etc., necessary for subsequent processings from each mesh of the map data read out by the data read processing means 68 from the map memory device 3, the line data comprising recommended routes and stored in the route memory means 63 and the point data comprising driving orbits and stored in the orbit memory means 69, on the basis of the information set by the display region judgement means 81. The clip processing algorithms hereby used include a Cohen-Sutherland line clip algorithm for the line and point data and a Sutherland-Hogman polygon clip algorithm for the plan and character data (Foley, van dam, Feiner, Hughes: Computer Graphics: Addison-Wesley Publishing Company, pp. 111–127). This processing can reduce the data quantity which should be subsequently subjected to coordinates conversion and plotting processing and can improve a processing speed.

Coordinates conversion means 83 enlarges or reduces the map data obtained by the clip processing to the target size and when an object must be displayed by rotating it, this means 83 so functions as to effect affin conversion of each coordinates value of the map data. Plotting judgement means 84 so functions as to select those data which are practically necessary for plotting by using the map data obtained by the coordinates conversion means 83. When the reduced scale is great, for example, the data quantity to be plotted substantially increases. Therefore, this means 84 so functions as to omit small roads and the names of places which may be omitted, and to eliminate character strings that are displayed in superposition with one another. Data clip means 85 so functions as to select the map data relating to the plotting area from the map data obtained from the plotting judgement means 84, by clip processing. The clip processing algorithm hereby used may be the same algorithm used by the initial data clip means. Further, this processing may be omitted. Artificial background setting means 86 provides the function which is necessary for bird's-eye view map display and displays the artificial background such as the horizontal line, the sky, etc., in order to reduce the plotting data quantity and to improve the screen recognition property Plotting command generation means 87 generates commands for plotting lines, polygons, characters, etc., so as to plot the resulting point, line and plane data as well as the character data by the designated colors and patterns, and the command for setting the colors and the patterns and outputs them to the graphic processing means 71.

Next, the fundamental display system of the bird's-eye view map display will be explained with reference to FIGS. 3A, B, C, D and FIG. 8.

Figure 2:
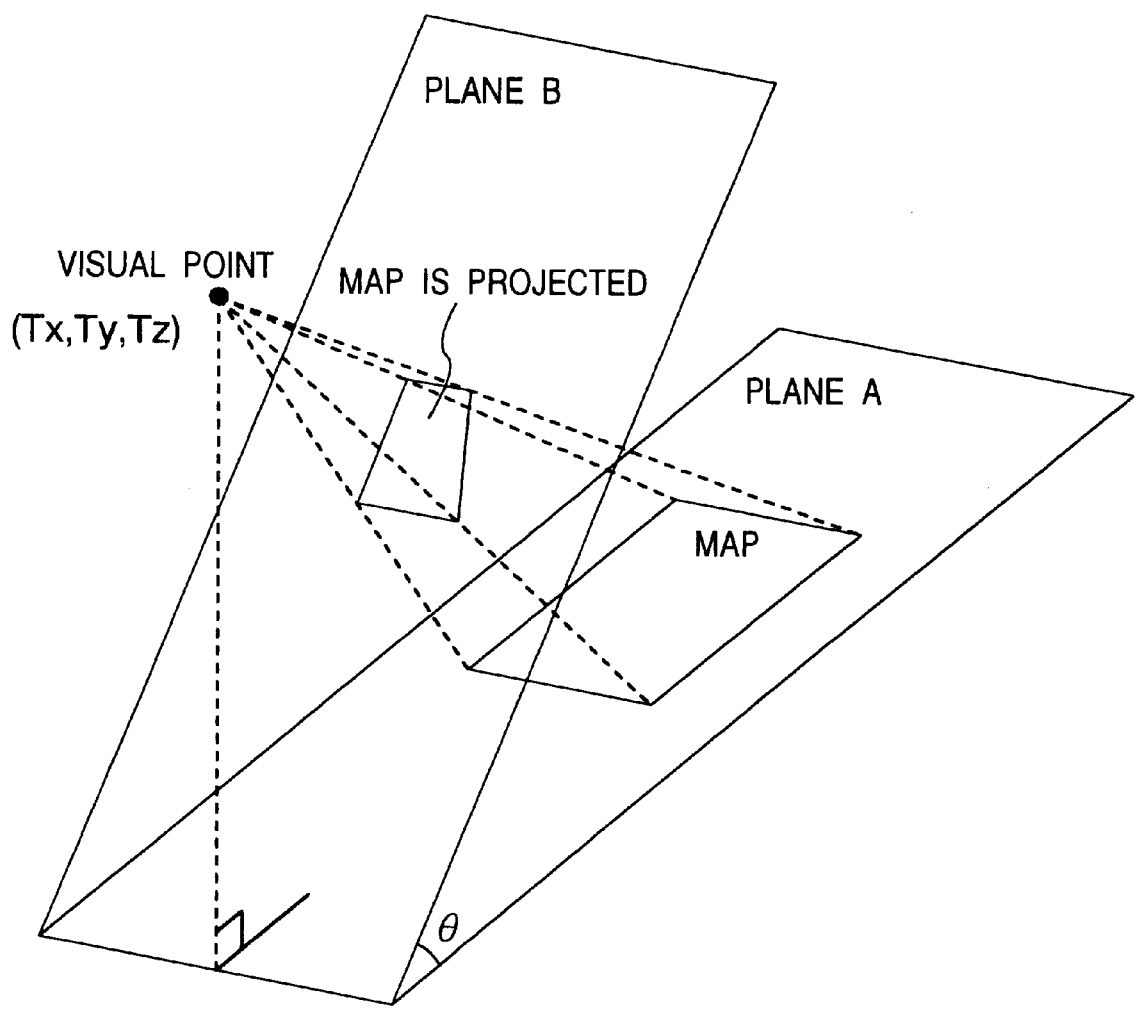
FIG. 2 is an explanatory view showing a perspective conversion processing of a map.
Figure 3A:
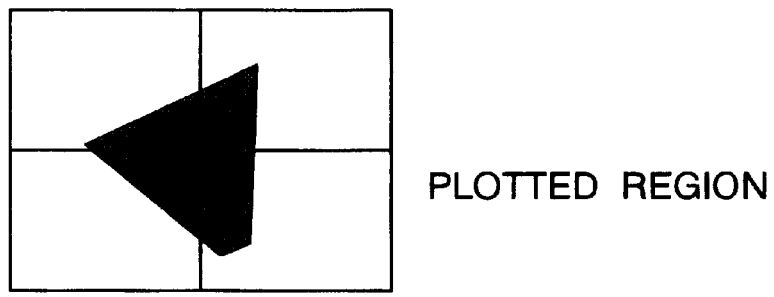
FIGS. 3A, 3B, 3C and 3D are explanatory views showing a perspective conversion process of a map.

At first, the region for bird's-eye view display is decided by the display region judgement means 81 from the position of the visual point and the direction of the visual field and from the angle $\Theta$ (projection angle) described between the plane A and the plane B in FIG. 2 (step 1 in FIG. 3A). When a bird's-eye view is displayed on a rectangular displays map data of a narrow region is necessary for the area near the visual point and map data of a broad region is necessary for the area remote from the visual point. Therefore, the map data of a trapezoidal mesh regions in the drawings is plotted finally. Next, the necessary map data is extracted by the initial data clip means 82 from the map mesh data inclusive of the region for bird's-eye view display by using the rectangular regions which are circumscribed with the trapezoidal region to be practically plotted (step 2 in FIG. 3B). Next, the coordinates conversion means 83 enlarges or reduces the extracted data and then executes affin conversion so that the trapezoid stands upright. Further, perspective conversion is executed so as to convert each coordinates value of the map data to the data which is represented three-dimensionally (step 3 in FIG. 3C). In this instance, perspective conversion is expressed by the following equations (1) and (2) where the position coordinates of the visual point are (Tx, Ty, Tz), the angle between the plane A and the plane B is Θ, the map data coordinates values before conversion are (x, y) and the map data coordinates values after conversion are (x', y'):

$$x' = \frac{T_x + x}{T_z + y \cdot \sin\theta} \quad (1)$$

$$y' = \frac{T_y + y \cdot \cos\theta}{T_z + y \cdot \sin\theta} \quad (2)$$

Figure 3B:
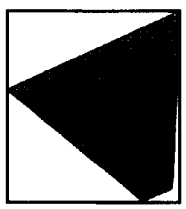
Figure 3C:
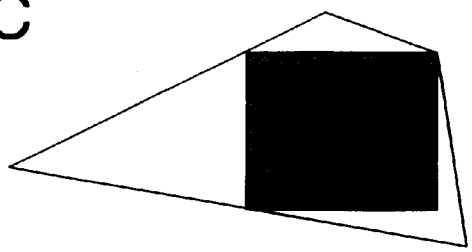
Figure 3D:

The trapezoid represented at the step 2 in FIG. 3B is subjected to coordinates conversion into the rectangular region represented at the step 3 in FIG. 3C whereas the rectangle circumscribed with the trapezoid represented at the step 2 in FIG. 3B is subjected to coordinates conversion into a deformed rectangle circumscribed with the rectangle represented at the step 3 in FIG. 3C, by perspective conversions respectively Because the portions other than the rectangular region need not be plotted, these portions other than the rectangular region are clipped by the data clip means 85 (step 4 in FIG. 3D). The plotting command generation means 87 generates the plotting command by using the map data so obtained, and the graphic processing means 71 conducts plotting to the VRAM 26 so that the bird's-eye view map shown in FIG. 1 can be displayed.

Figure 23A:
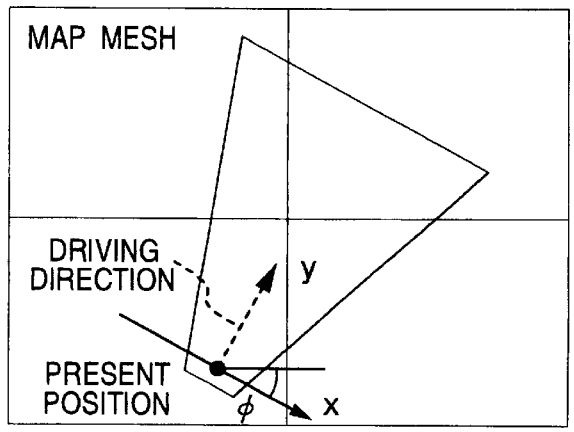
FIGS. 23A, 23B and 23C are explanatory views useful for explaining a setting method of a visual point and a projection plane in bird's-eye view map display.
Figure 23B:
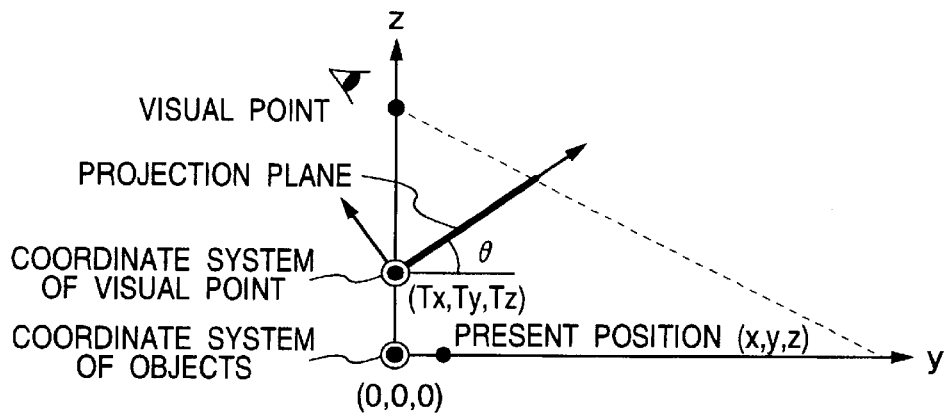
Figure 23C:
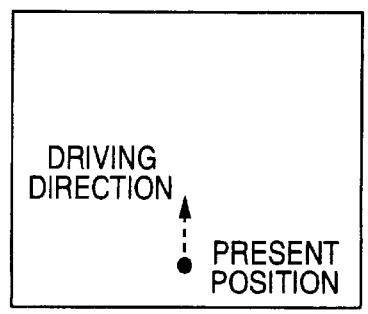

Next, the perspective conversion parameters in bird's-eye view map displays that is, the angle Θ between the map and the projection plane (projection angle) and the coordinates (Tx, Ty, Tz) of the origin of the visual point coordinates system containing the projection plane, which is viewed from the object coordinates system containing in turn the map plane, or in other words, the method of calculating the position of the projection plane, will be explained with reference to FIGS. 23A, B and C. It is desired for the navigation apparatus to display in detail the point at which the user is now driving, that is, the region around the present position Therefore, the explanation will be given on the case where the present position is displayed at the lower center portion of the screen as shown in FIG. 23C. To accomplish bird's-eye view display, it is judged whether rotation of map is necessary at step 1002, and in the event the rotation is considered necessary then the angle φ between the driving direction vector and the base of the map mesh is first determined at the step 1004 in FIG. 9, and affin conversion for rotating the map data to be plotted by the angle φ is executed for each data constituting the map (step 1005). Since bird's-eye view display is judged as being made at the step 1006, the flow proceeds to the processing for calculating the projection angle Θ and the position of the visual point (steps 1008 and 1009). The projection angle Θ is set to an angle near 0 when it is desired to make display so that the difference of the reduced scale becomes small between the portions near the visual point and the portions away from the visual point, and is set to near 90° when it is desired to make display so that the difference of the reduced scale becomes great between the portions near the visual point and the portions away from the visual point. Normally, the projection angle Θ is set to the range of about 30 to about 45°. Since the user desires to arbitrarily set the map region to be displayed by bird's-eye view map display, the projection angle Θ can be set by the projection angle change key 43 provided to the navigation apparatus shown in FIG. 6. When this key 43 is so operated as to increase the projection angle, the projection angle increases, so that the map of remote regions is displayed. When the key 43 is so operated as to decrease the projection angle, the projection angle Θ decreases, so that the map near the present position is displayed.

Next, as to the position (Tx, Ty, Tz) of the projection plane, calculation is executed at the step 1009 so that the difference (Δx, Δy, Δz) obtained by subtracting the position (Tx, Ty, Tz) of the position of the projection plane from the present position (x, y, z) is always a constant value. As the absolute values, further, Δx is set to 0, Δz is set to a small value when display is made by a small reduced scale in match with the reduced scale of the map display and to a large reduced scale when display is made by a large reduced scale. Normally, Δz is decided preferably so that the reduced scale of the plane view is coincident with the reduced scale of a certain point near the center of bird's-eye view display. Since the reduced scale of the map is preferably changeable in accordance with the user's request, the step 1009 operates in such a manner as to set Δz to a small value when the user designates a small reduced scale by the reduced scale key 42 provided to the navigation apparatus shown in FIG. 6 and to a large value when a large reduced scale is designated. The Δy value may be either a positive value or a negative value but this embodiment uses the negative value and sets it so that the present position is displayed at a lower ⅓ position of the screen. Step 1010 executes perspective conversion of each coordinates value of the map data by using the projection angle Θ and the position (Tx, Ty, Tz) of the projection plane that are obtained in the manner described above.

Figure 10:
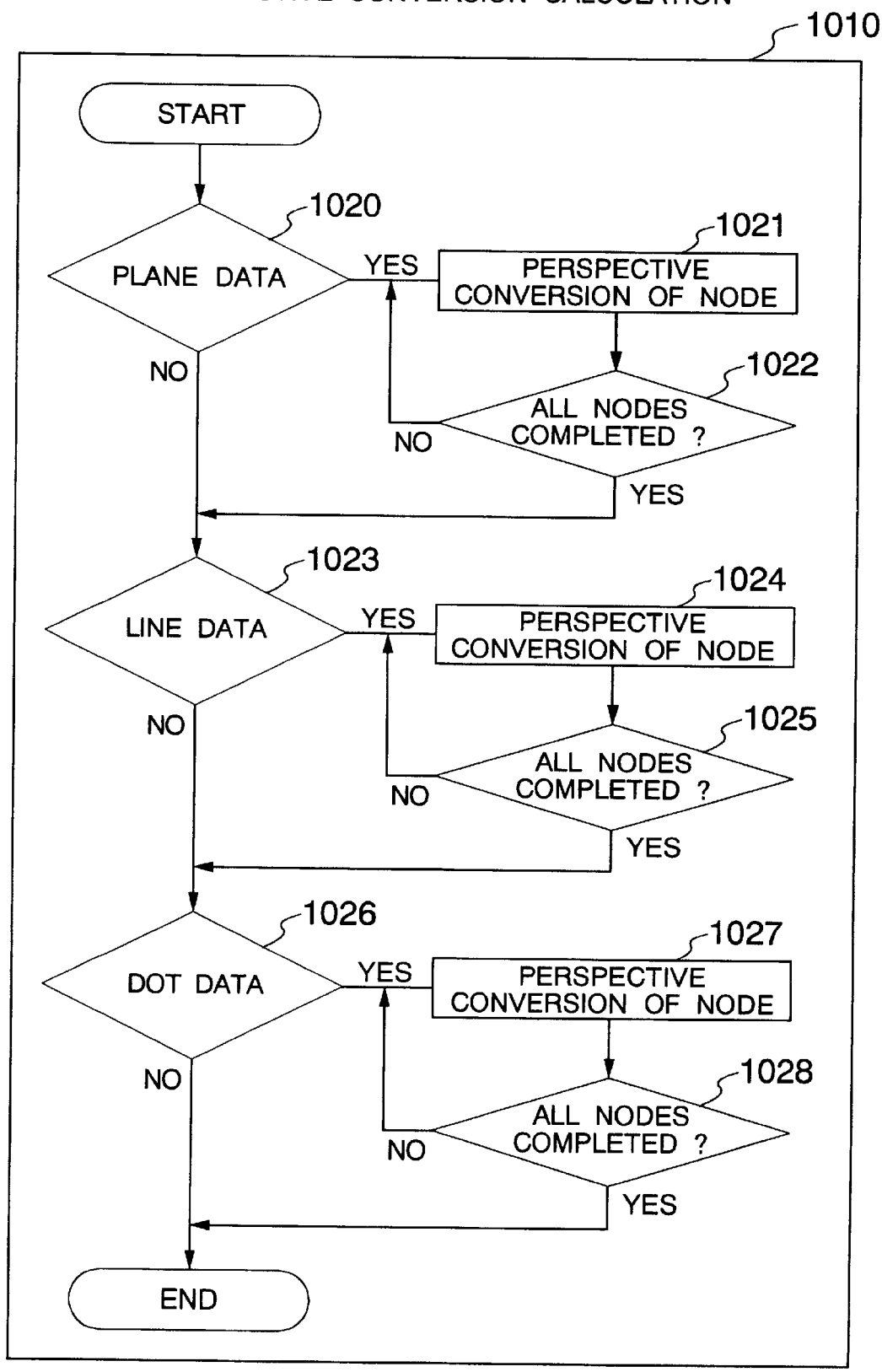
FIG. 10 is a flowchart of perspective conversion computation for accomplishing bird's-eye view map display.

The detail of this perspective conversion operation will be explained with reference to FIG. 10. First, whether or not the plane data constituted by polygons such as water systems, green zones, etc., exist is judged (step 1020). When the result proves YES, perspective conversion is executed for each node constituting the polygon (step 1021). This operation is executed for all the polygons (step 1022). Next, when the line data constituting the map such as the roads, the railways, the administrative districts, etc., and the optimum route from the present position to the destination are calculated, whether or not the line data representing the route exist is judged (step 1023). When the result proves YES, perspective conversion is executed for each node that constitutes the line (step 1024). Further, when the character data constituting the map such as the area names, symbols, etc., and the orbit are displayed, whether or not the point data representing the orbit exist is judged (step 1026). As to the character strings such as the area names, symbols, etc., it is advisable to handle one point representing a given character string such as the upper left end point of the character string as the point data. When these point data are judged as existing, perspective conversion is executed for each node constituting the point (step 1027) and is then executed for all the points (step 1028). The graphic processing means 71 executes plotting processing by using the map data so obtained. In consequence, in bird's-eye view map display shown in FIG. 23C, the driving direction is always displayed in the UP direction on the screen and the present position is always displayed at the same point on the screen.

Figure 9:
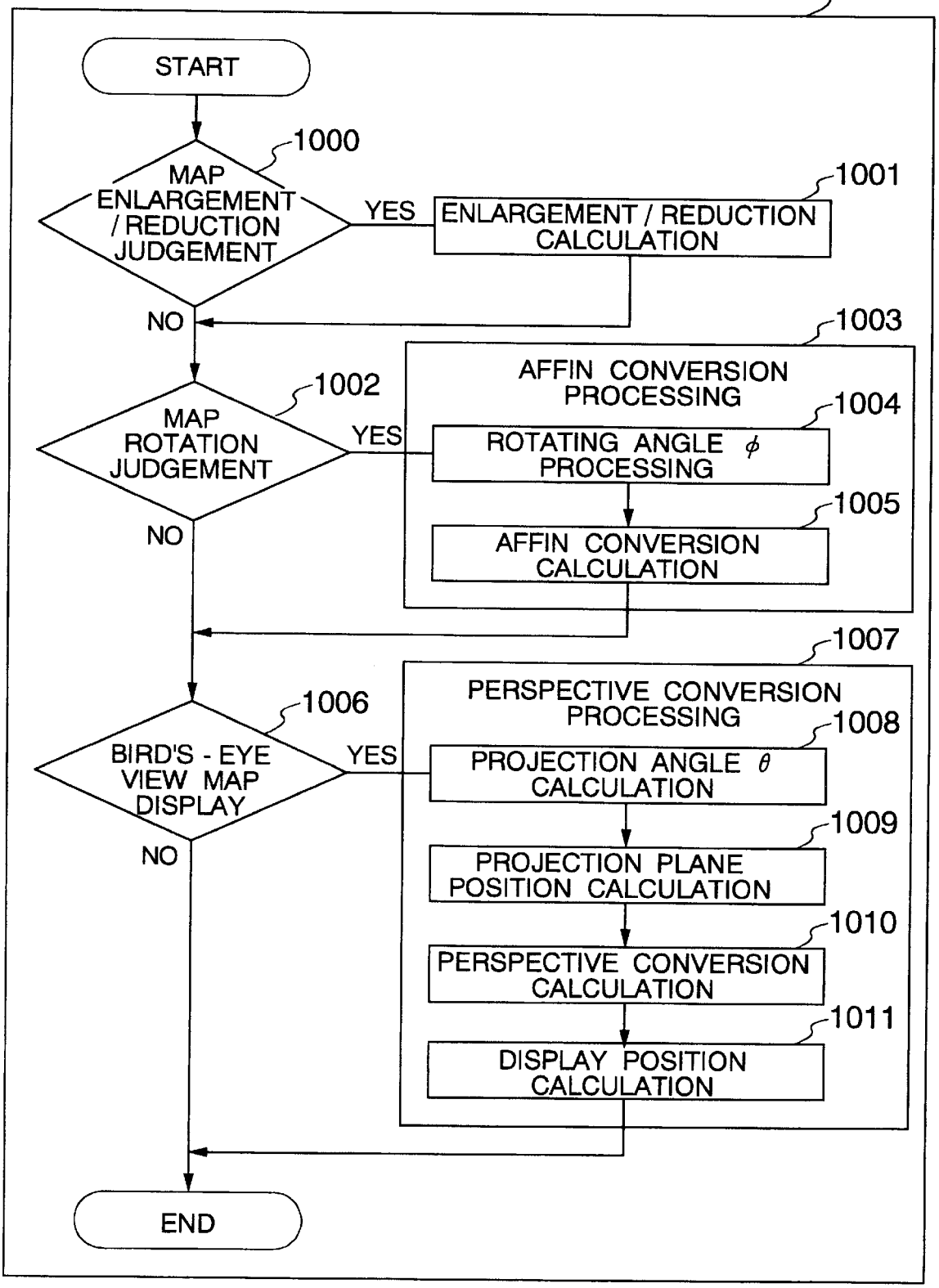
FIG. 9 is a flowchart of coordinates conversion means for accomplishing bird's-eye view map display.

Next, the explanation will be given on the display method of the bird's-eye view map, which can be easily recognized by the driver, when a certain destination is designated by the input device 5 from the map or the retrieved screen, will be explained with reference to FIG. 9 and FIGS. 24A, B and C. It is desired for the navigation apparatus to display in detail the point at which the user is driving at present, that is, the area near the present position. Therefore, the present position is displayed at the center lower portion of the screen, more concretely at the lower ⅓ region of the transverse center of the screen, as shown in FIG. 24C. To accomplish bird's-eye view display shown in FIG. 24C, the angle $\phi$ between the line perpendicular to the line connecting the present position to the destination shown in FIG. 24A and the base of the map mesh is first determined at the step 1004 in FIG. 9 and affin conversion is executed by the angle $\phi$ for each coordinates value of the map data to be plotted (step 1005). Since this bird's-eye view display is judged as being made at the step 1006, the flow then proceeds to the processings for calculating the projection angle $\Theta$ and the position of the visual point (steps 1008 and 1009). The projection angle $\Theta$ is set to an angle near 0 when it is desired to make display so that the difference of the reduced scale between small between the portions near the visual point and the portions away from the visual point, and is set to an angle near 90° when it is desired to make display so that the difference of the reduced scale becomes great between the portions near the visual point and the portions away from the visual point. Normally, the projection angle is set to the range of about 30 to about 45°. Since the user desires to arbitrarily set the map region to be displayed by bird's-eye view map displays the projection angle $\Theta$ can be set by the projection angle change key 43 provided to the navigation apparatus shown in FIG. 6. When this key 43 is so operated as to increase the angle, the projection angle $\Theta$ increases, so that the map of remote portions is displayed. When the key 43 is so operated as to decrease the projection angle, the projection angle $\Theta$ decreases, so that the map near the present position is displayed.

Next, as to the position (Tx, Ty, Tz) of the projection plane, calculation is made at the step 1009 so that the difference ($\Delta x$, $\Delta y$, $\Delta z$) obtained by subtracting the position (Tx, Ty, Tz) of the projection plane from the present position (x, y, z) becomes always a constant value. As the absolute values, $\Delta x$ is set to 0, and $\Delta z$ is set to a small value when display is made by a small reduced scale in match with the reduced scale of the map displayed, and to a great value when display is made by a large reduced scale. Normally, $\Delta z$ is preferably set so that the reduced scale of the plan view is coincident with the reduced scale of a certain point near the center of bird's-eye view display Since the desires to change the reduced scale of the map, the step 1009 so operates as to set a small value to $\Delta z$ when the user designates a small reduced scale by the reduced scale key 42 provided to the navigation apparatus shown in FIG. 6 and to set a large value to $\Delta z$ when the user designates a large reduced scale. The $\Delta y$ value may be either a positive value or a negative value, but this embodiment uses the negative value and determines the value so that the present position can be displayed at the lower ⅓ position of the screen The step 1010 executes perspective conversion of each coordinates value of the map data by using the projection angle $\Theta$ and the position (Tx, Ty, Tz) of the projection plane so obtained, and the graphic processing means 71 executes the plotting processing by using the resulting map data. Consequently, in bird's-eye view display shown in FIG. 24C, the destination is always displayed in the UP direction and the present position is always displayed at the same position on the screen. The navigation apparatus becomes easier to operate by switching the operation mode to the mode in which the destination and the present position are fixed always at certain two points on the screen when the car moves to the position where the destination can be displayed on the screen.

Figure 11:
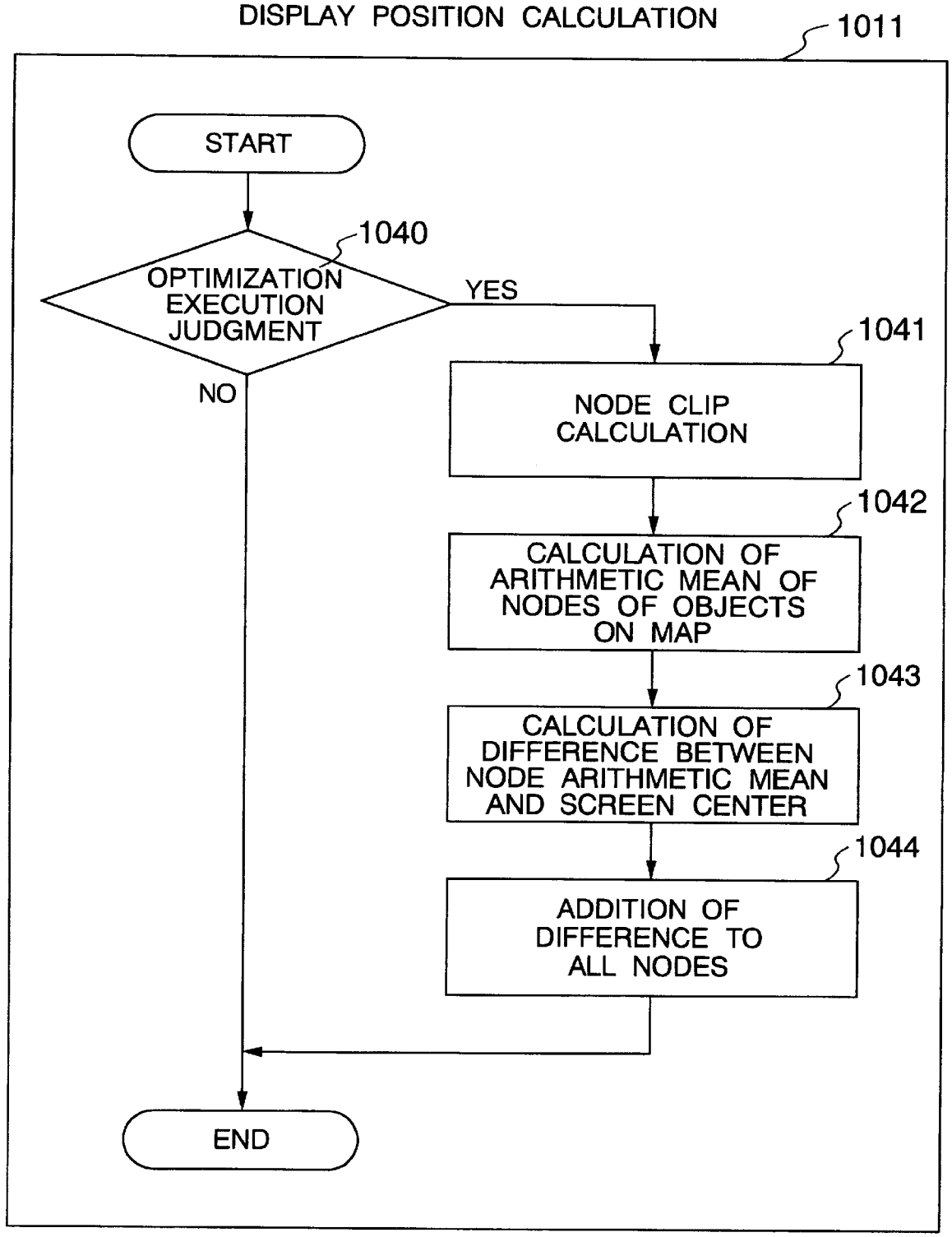
FIG. 11 is a flowchart of display position computation for accomplishing bird's-eye view map display.
Figure 24A:
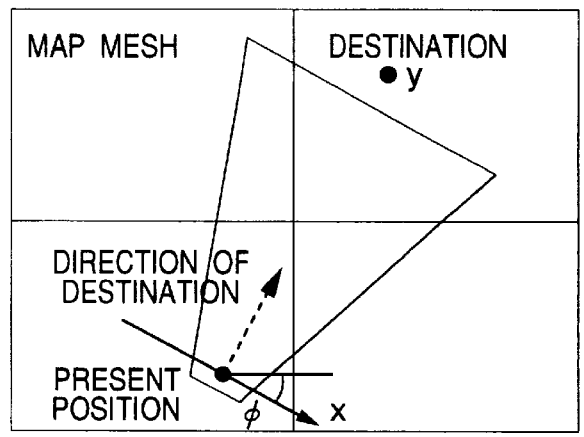
FIGS. 24A, 24B and 24C are explanatory views useful for explaining a setting method of a visual point and a projection plane in bird's-eye view map display.
Figure 24B:
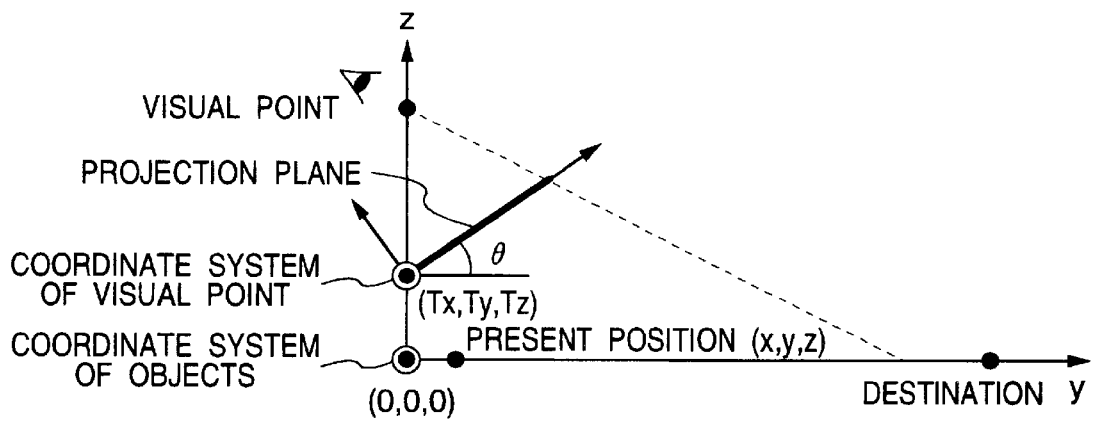
Figure 24C:
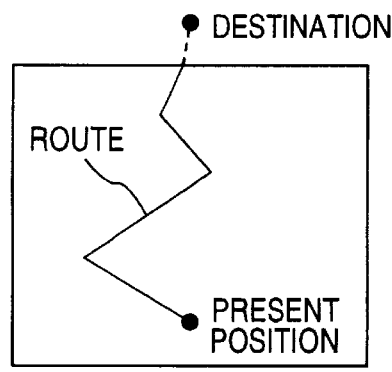
Figure 25A:
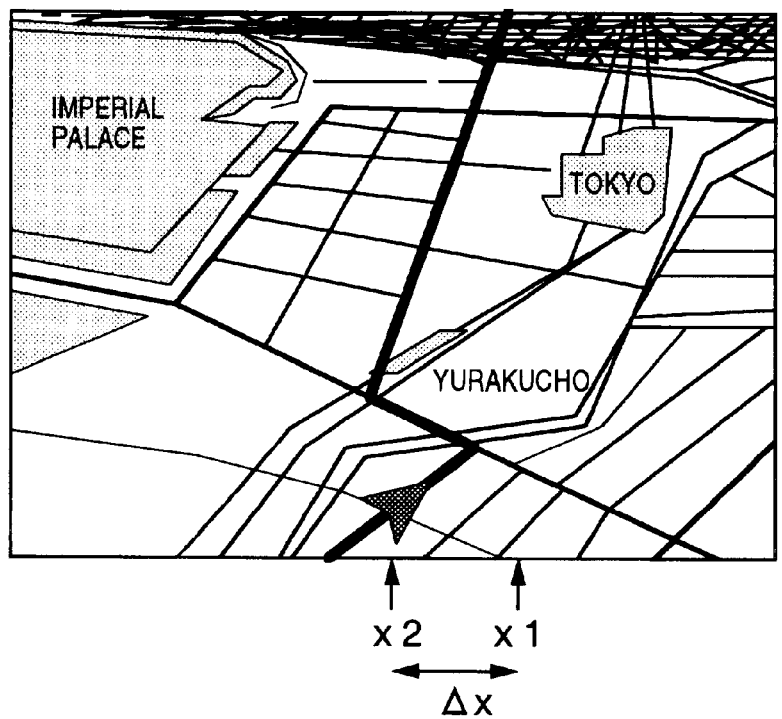
FIGS. 25A and 25B show an embodiment for optimization display of the present position in bird's-eye view map display.
Figure 25B:
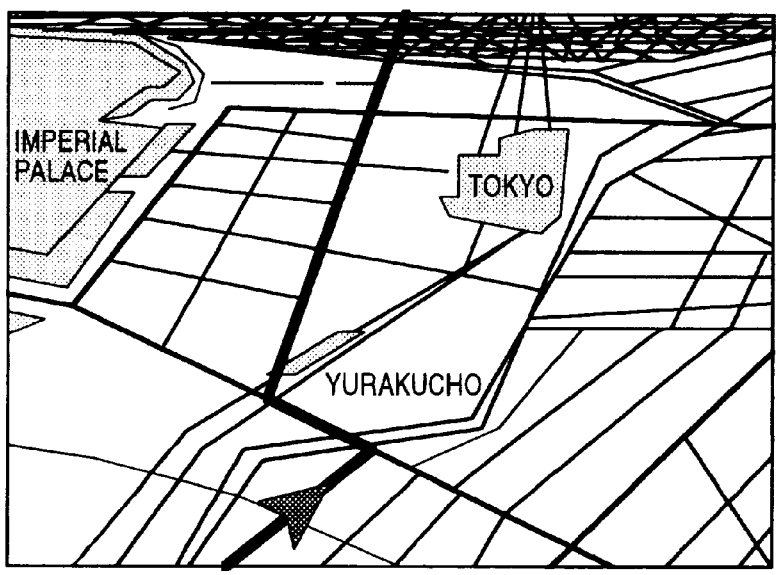

Incidentally, the polygon representing the Imperial Palace, the green zones and the water systems such as sea and lakes are not much useful as the information for the driver driving the car having the navigation apparatus, as shown in FIG. 24A. Rather, a greater quantity of information which is directly necessary for driving such as the road information, are displayed preferably on the limited screen. Means for solving this problem will be explained with reference to FIG. 11. The information of the roads and the background are represented by the nodes, and the node density of the polygons representing the green zones and the water systems such as sea and lakes tends to be lower than the node density of the lines such as the roads. Therefore, the greatest quantity of information of the roads, etc., are displayed by optimizing the display region in the transverse direction of the screen, for the region displayed in the longitudinal direction, in accordance with the initial value. This processing is executed by the display position calculation routine at the step 1011 in FIG. 9. First, whether the mode is for executing optimization of the display position is judged (step 1040). When optimization is judged as to be executed, the nodes that are practically displayed on the screen are extracted from the nodes constituting the lines and the polygons subjected to perspective conversion at the step 1041 by clip calculation (step 1041). Further, the difference $\Delta x$ between the x coordinates arithmetic mean value obtained at the step 1042 and the x-coordinates value x2 at the center of the screen is calculated (step 1043). At the next step 1044, the difference $\Delta x$ obtained by the step 1043 is added to the x-coordinates value of the nodes constituting the line and the polygon. The graphic processing means 71 executes the plotting processing by using the map data obtained in this manner In consequence, bird's-eye view map display capable of displaying a greater quantity of those information which are directly necessary for driving, such as the roads, can be displayed on the screen as shown in FIG. 25B.

Figure 12:
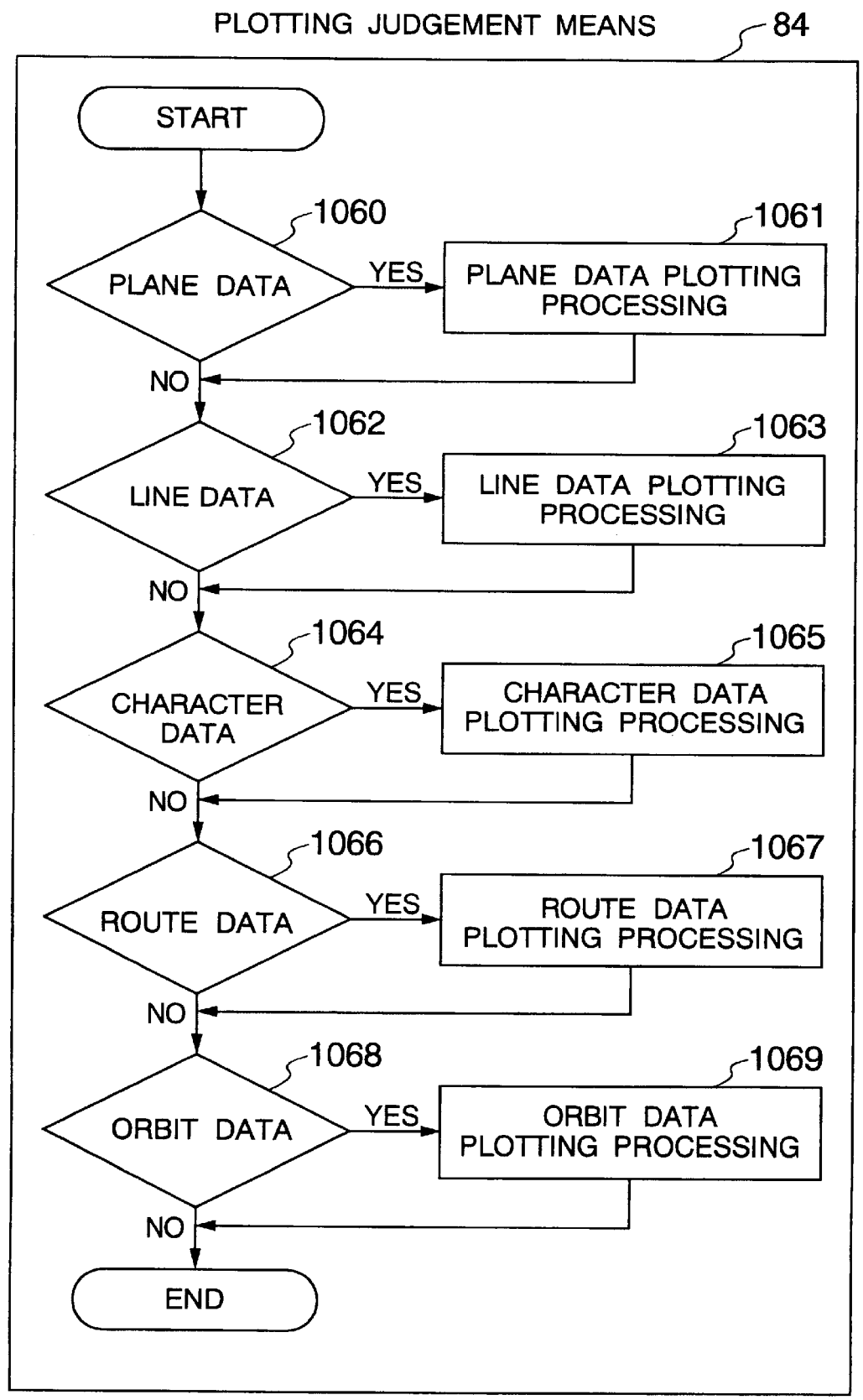
FIG. 12 is a flowchart of plotting judgement means for accomplishing bird's-eye view map display.

Next, the method of the plotting processing of the objects constituting the bird's-eye view map will be explained more concretely The plotting judgement means 84 shown in FIG. 12 operates in such a manner as to optimally display the plan data, the line data and the character data constituting the map, the route data calculated in accordance with the request from the user and the orbit data representing the route so far driven, respectively.

Figure 13A:
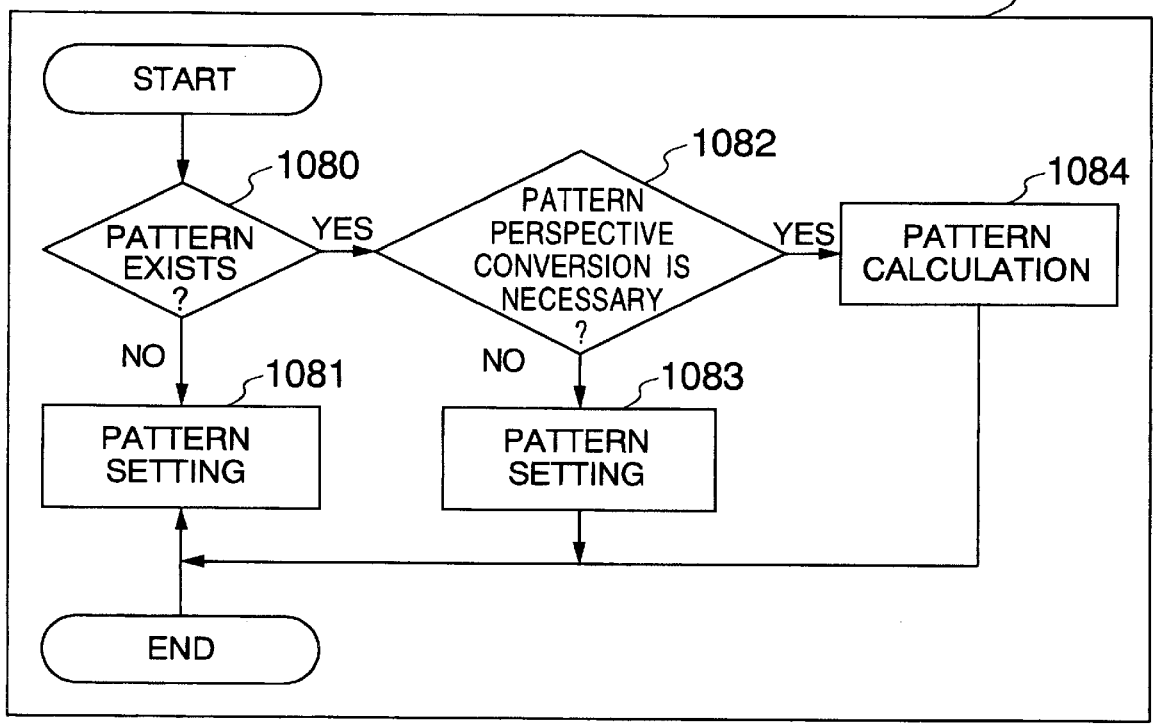
FIGS. 13A and 13B are flowcharts of polygonal and linear pattern displays in bird's-eye view map display.
Figure 41A:
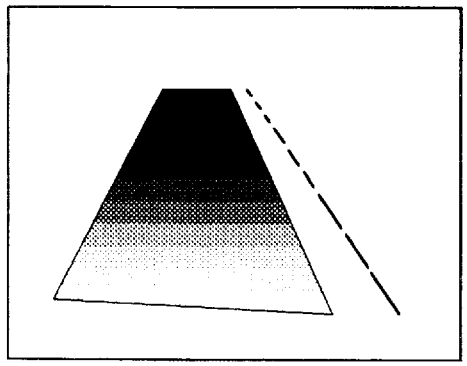
FIGS. 41A, 41B and 41C show an embodiment for polygonal and linear pattern display in bird's-eye view map display.
Figure 41B:
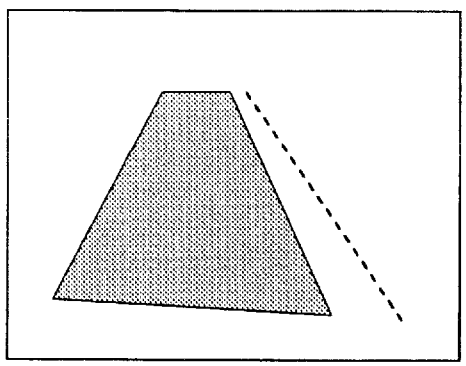
Figure 41C:
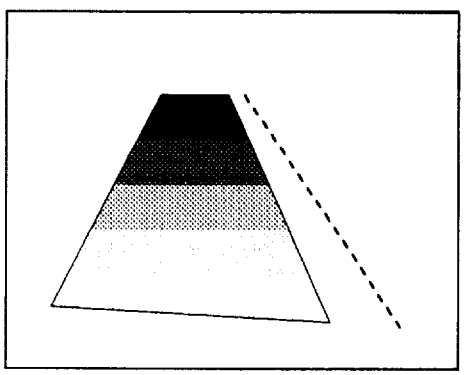

First, whether or not the plane data exists in the plotting data is judged (step 1060). When the plane data is judged as existing, the flow proceeds to the plane data plotting processing (step 1061) shown in FIG. 13A. The plane data plotting processing judges whether the plane pattern exists inside the polygon to be practically plotted or whether the full plane should be smeared away (step 1080). When the plane pattern is not judged as existing, pattern setting is so effected as to smear away the entire portion inside the polygon and the processing is completed (step 1081). When the plane pattern is judged as existing, whether or not perspective conversion is to be executed for the plane pattern is judged (step 1082). When the plane pattern is subjected to perspective conversion and is displayed, the pattern has the feel of depth as depicted in FIG. 41A and can be therefore displayed more three-dimensionally However, the plotting time gets elongated because the processing quantity becomes greater When the plane pattern used for plan view map display is displayed, on the other hand, the display becomes planar as depicted in FIG. 41B, but the processing can be made at a higher speed because the plane pattern can be handled two-dimensionally Therefore, when a higher processing speed is required, perspective conversion of the pattern is judged as unnecessary at the step 1082 and the designated pattern itself is set as the pattern data (step 1083). When display quality has higher priority, on the other hand, perspective conversion of the pattern is judged as necessary at the step 1082. Therefore, the pattern is subjected to perspective conversion and the conversion result is set as the pattern data (step 1084). The method shown in FIG. 41C may be employed as means for improving this processing speed. This method divides a polygon into a plurality of regions (four regions shown in the drawing) in the direction of depth and smearing away each region by using the mean pattern obtained by subjecting the plane pattern to perspective conversion in each of the region. Since the pattern becomes a two-dimensional pattern inside the region according to this methods the processing speed can be improved.

Figure 13B:
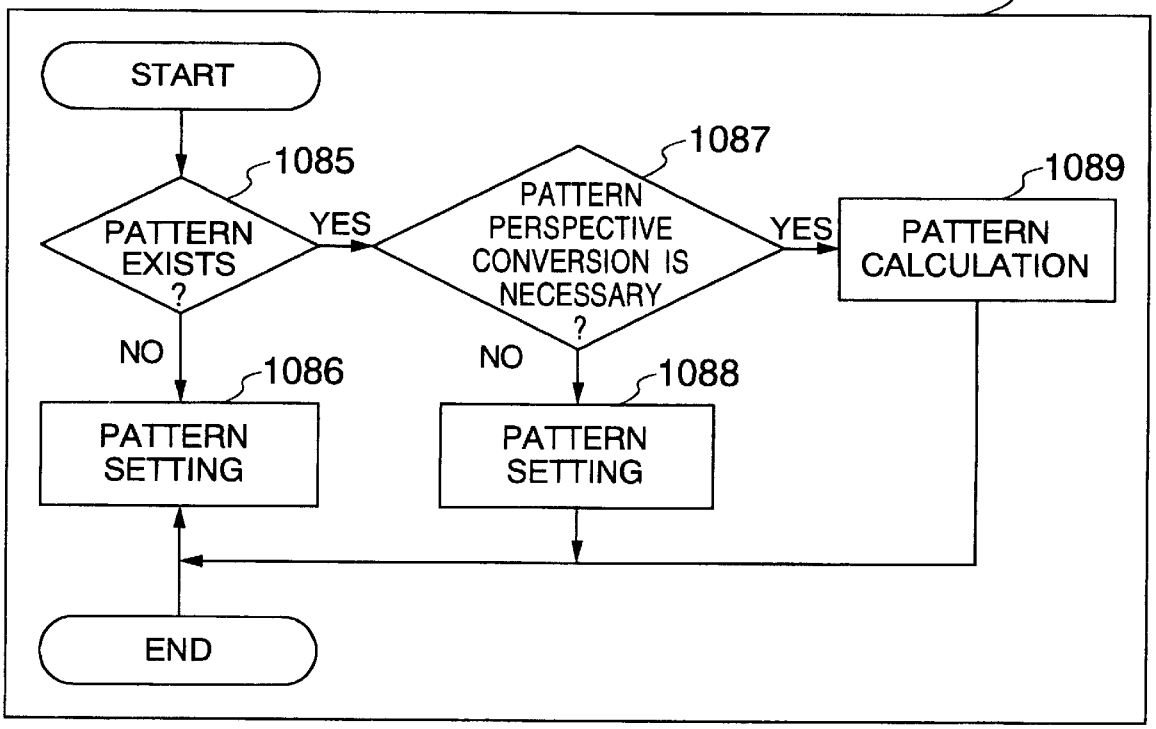

Next, whether or not the line data exists in the plotting data is judged (step 1062). When the line data is judged as existing, the processing shifts to the line data plotting processing (step 1063) in FIG. 13B. In this line data plotting processing, whether the line pattern exists in the lines practically plotted or is smeared by solid lines is judged (step 1085). When the line pattern is not judged as existing, pattern setting is effected so as to draw the solid lines and the processing is completed (step 1087). When the line pattern is judged as existing, whether or not perspective conversion is to be effected for the line pattern is judged (step 1087). When the line pattern is subjected to perspective conversion and is displayed, the feel of depth develops as shown in FIG. 41A and representation can be made more three-dimensionally However, the plotting time gets elongated in this case because the processing quantity increases. When display is made by the line pattern used for plan view map display, display becomes planar as shown in FIG. 41B, but high speed processing can be made because the line pattern can be handled unidimensionally. Therefore, when a higher processing speed is required, perspective conversion of the pattern is not judged as necessary at the step 1087 and the designated pattern itself is set as the pattern data (step 1088). On the other hand, when higher priority is put to display quality, perspective conversion of the pattern is judged as necessary at the step 1087. Therefore, the pattern is subjected to perspective conversion and the converted result is set as the pattern data (step 1089).

Figure 26A:
Figure 26B:
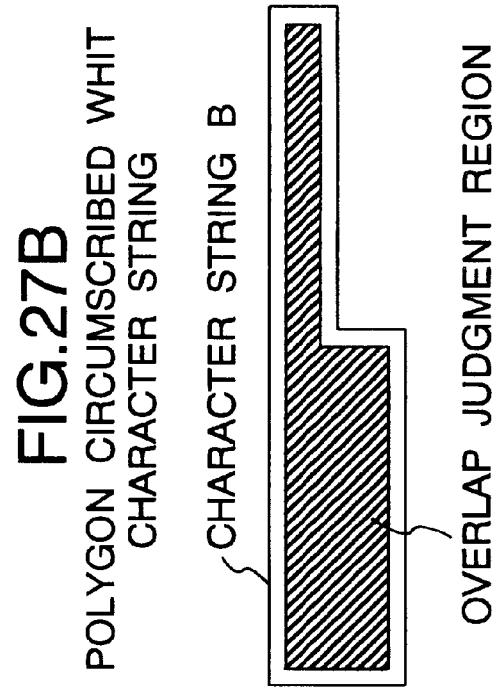
Figure 27A:
Figure 27B:
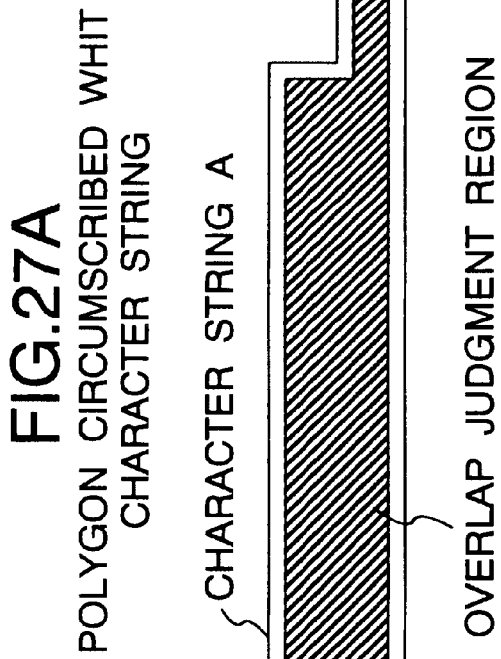

Next, whether or not the character data exists in the plotting data is judged (step 1064). When the character data is judged as existing, the processing proceeds to the character data plotting processing (step 1065) in FIG. 14. The character data plotting processing judges to which attribute the character string in the map, which character string comprises a plurality of attributes such as the names of places, the names of buildings, the map symbols, etc., belong (step 1100), selects the character strings having predetermined attributes that must be displayed essentially, and hands over the processing to the step 1101. Since the character string having the attributes that must be essentially displayed is selected, buffering is made so as to display this character string at the step 1101. Next, overlap of one character string with another is judged (step 1102). There are a plurality of methods for judging overlap of the character strings. The first method calculates the polygon encompassing the character string (the outer frame of the polygon shown in FIGS. 26A and B) as shown in FIGS. 26A, B, 27A, B, 28A, B, 29A and B and judges the overlap of the characters by using a polygonal region information (the hatched pattern region of the polygon shown in FIGS. 27A and B) constituted positioned inward by a predetermined number of bits from the polygon. According to this method, the character strings are judged as overlapping when the overlap judgement regions (the hatched pattern regions of the polygons) overlap with one another as shown in FIGS. 28A and B. When the character overlap judgement regions do not overlap as shown in FIGS. 29A and B, the character strings are not judged as overlapping Generally, the respective character strings can be discriminated even when the characters overlap to some extents, and this system operates in such a manner that overlap of the character strings to some extents are not judged as overlapping. Accordingly, the overlapping character strings are not omitted more than necessary, and the quantity of information to be transmitted to the driver increases.

Next, the second method will be explained with reference to FIGS. 30A, B, 31A, B, 32A, B, 33A and B. This method calculates the rectangular regions circumscribed with the character string (the rectangles shown in FIGS. 30A and B) and judges overlap of the character strings by using the rectangular region information (the hatched rectangular regions shown in FIGS. 30A and B). According to this method, when the overlap judgement regions of the character strings (the hatched rectangular regions) overlap with one another as shown in FIGS. 32A and B, the character strings are judged as overlapping. When the character overlap judgement regions do not overlap with one another as shown in FIGS. 33A and B, the character strings are not judged as overlapping. Since this method can judge overlap of a plurality of character strings by a simple shape of the rectangle, the minimum and maximum values of the rectangle in the x- and y-axis directions may be merely compared between the overlapping character strings, and the operation time can be therefore shortened.

Figure 34A:
Figure 34B:
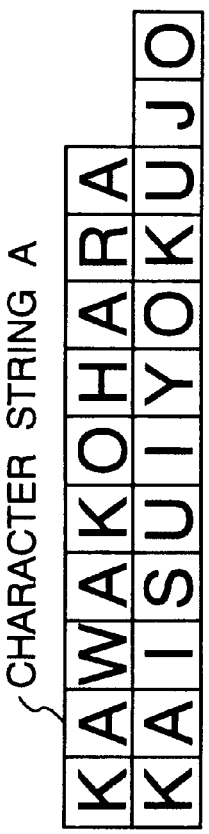
Figure 35A:
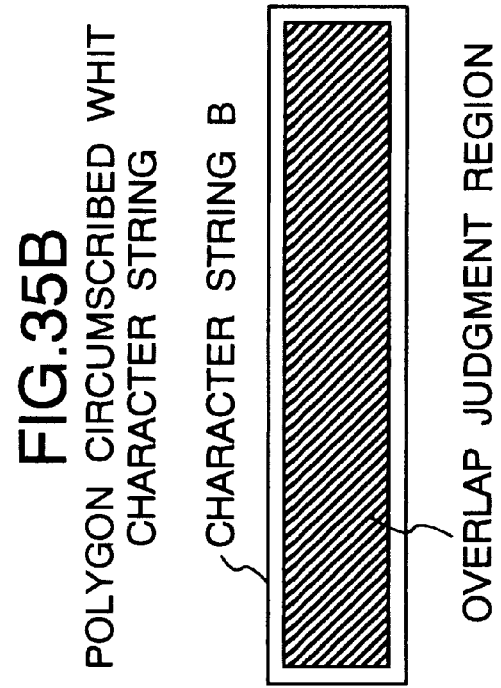
Figure 35B:
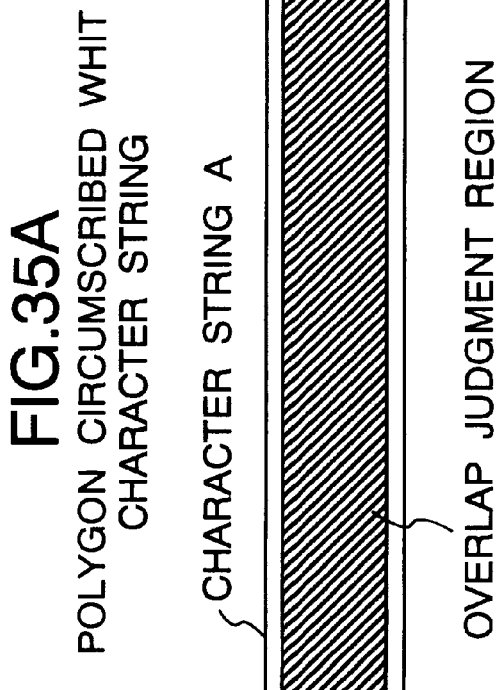

Finally, the third method will be explained with reference to FIGS. 34A, B, 35A, B, 36A, B, 37A and B. This method calculates the rectangular region circumscribed with the character string (the rectangle of the outer frame shown in FIGS. 35A and B) and judges overlap of the character strings by using the rectangular region information (the hatched rectangular pattern region shown in FIGS. 35A and B) constituted by a region positioned inward by a predetermined number of dots from the rectangle. According to this method, the character strings are judged as overlapping when the overlap judgement regions of the character strings (the hatched rectangular pattern regions) overlap with one another as shown in FIGS. 36A and B. The character strings are not judged as overlapping when the overlap judgement regions do not overlap with one another as shown in FIGS. 37A and B. Generally, the respective character strings can be discriminated even when overlap of characters occurs to some extents, and this system operates in such a manner that the character strings are not judged as overlapping even when they overlap to some extents. Therefore, the overlapping character strings are not omitted more than necessary, and the quantity of the information to be transmitted to the driver increases. Further, because overlap of a plurality of character strings is judged by a simple shape of the rectangles the minimum and maximum values in the x- and y-axis directions may be merely compared between a plurality of character strings, and the operation time can be shortened.

Figure 38A:
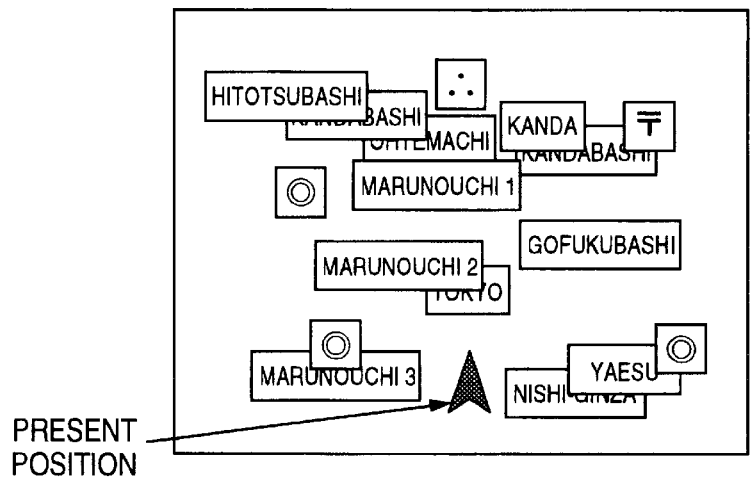
FIGS. 38A, 38B and 38C show an embodiment for avoiding character string overlap display in bird's-eye view map display.
Figure 38B:
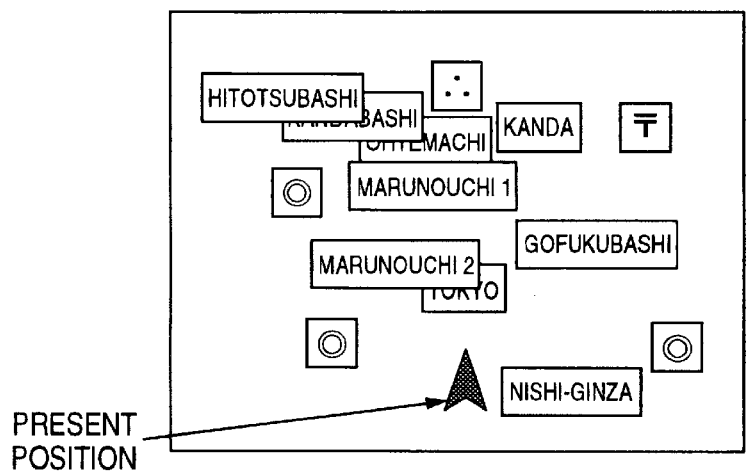
Figure 38C:
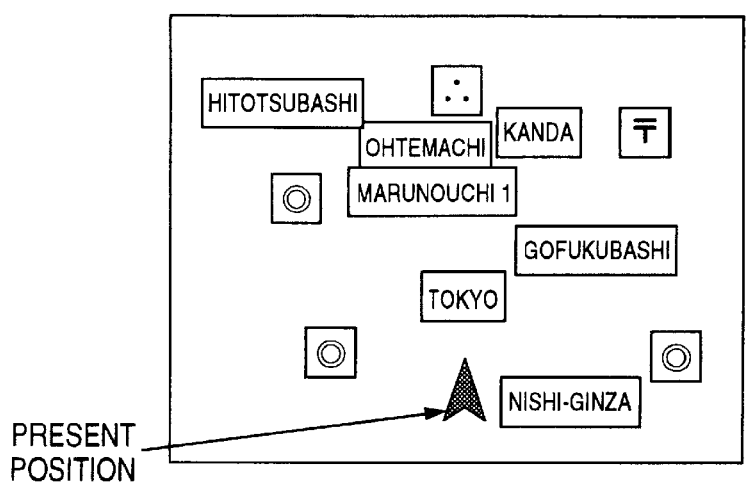
Figure 39A:
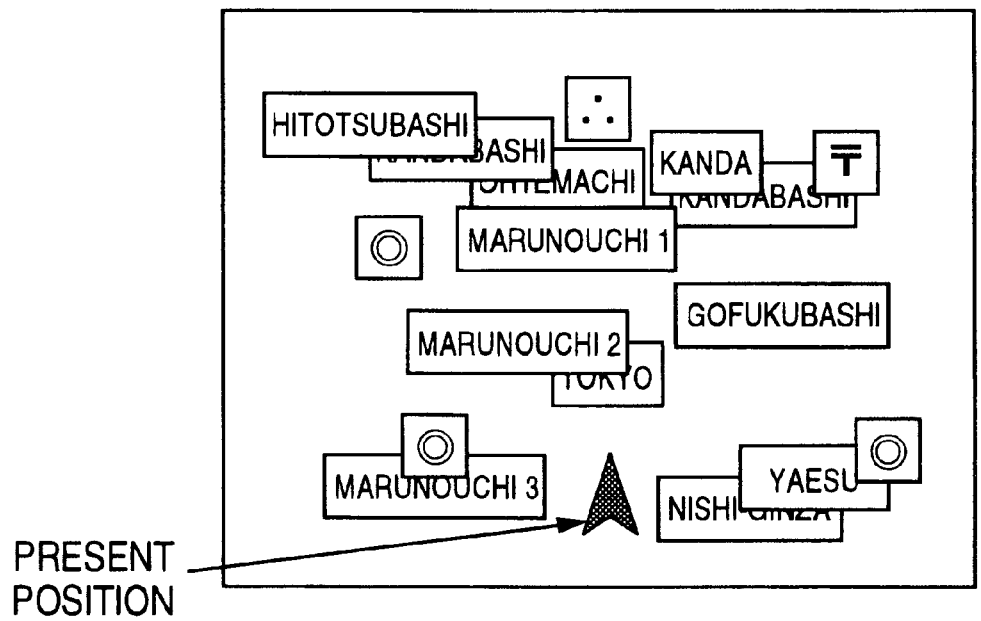
FIGS. 39A and 39B show an embodiment for avoiding character string overlap display in bird's-eye view map display.
Figure 39B:
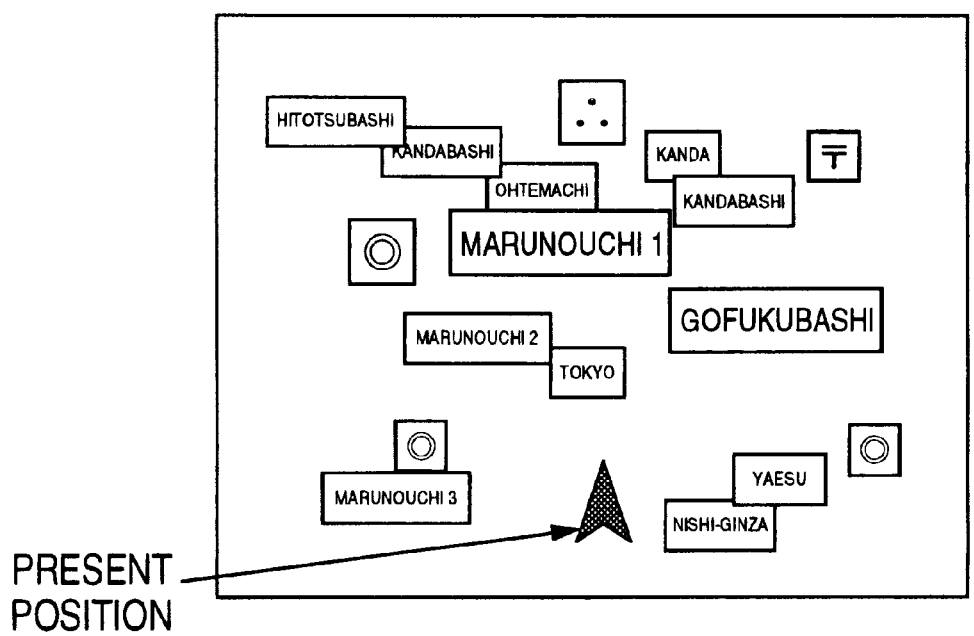
Figure 40A:
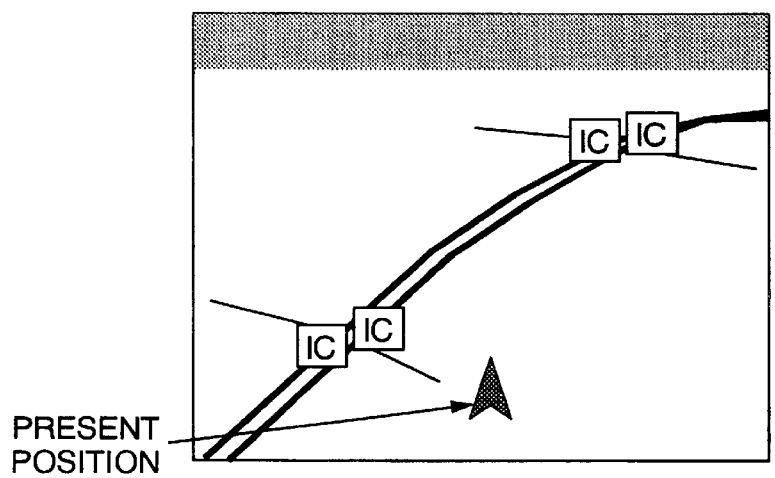
FIGS. 40A, 40B and 40C show an embodiment for displaying the same character string in bird's-eye view map display.
Figure 40B:
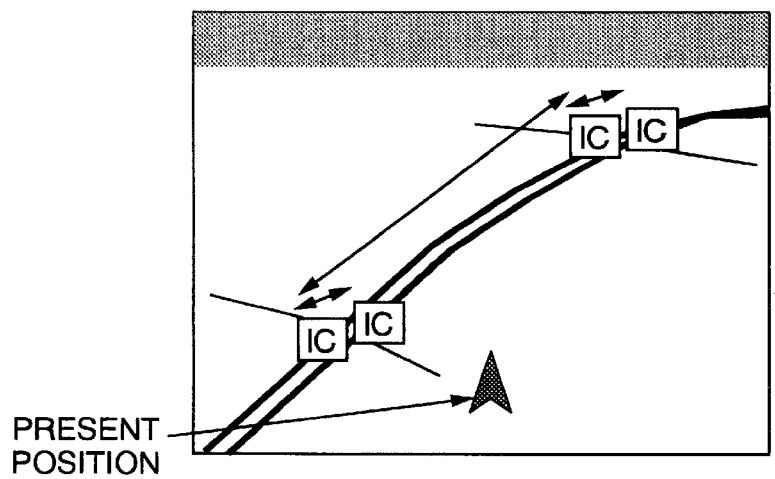
Figure 40C:
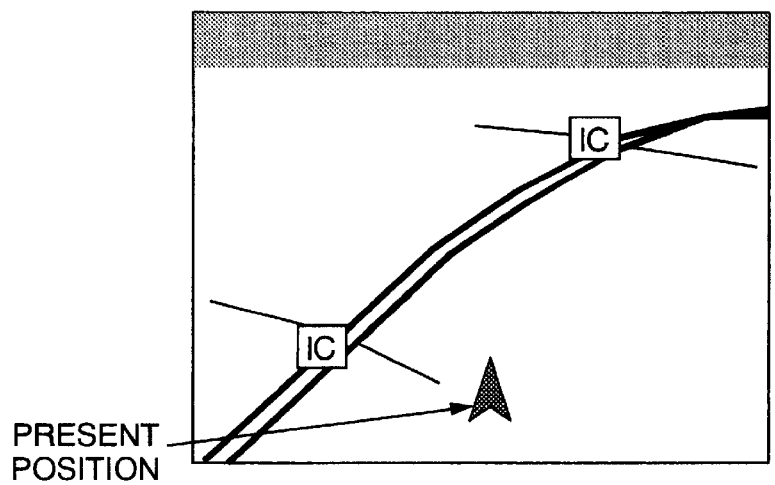

When overlap of the character strings is judged as existing after overlap is judged by any of the three kinds of character overlap judgement means described above, the attributes of the overlapping character strings are examined (step 1103). When the attributes of the overlapping character strings are judged as different, the character strings having the attributes which are decided as having higher priority for display are selected and are buffered (step 1104). Such an embodiment is shown in FIGS. 38A, B and C. It will be hereby assumed that the initial state has the screen structure such as shown in FIG. 38B, and comprises the symbol attributes constituted by symbols such as double circles and the post marks, and the character string attributes constituted by the character strings. If the symbol attributes are to be preferentially displayed when the processing of the step 1104 is executed, the symbol attributes are preferentially displayed when the character string and the symbol overlap with each other as shown in FIG. 38A. In other words, the position at which "double circle" and the place name "Marunouchi" overlap with each other is displayed by the "double circle" and at the position at which the postal symbol "〒" overlaps with the place name "Kandabashi" is displayed by the symbol "〒" Next, when the attributes of the character strings are judged as the same as a result of examination of the attributes of the overlapping character strings (step 1103), sorting is then effected in the depth-wise direction for the character string (step 1105). Furthers the character string close to the present position is selected and is then buffered (step 1106). Such an embodiment is shown in FIG. 38C. Here, if the character strings overlap with each other when the processing of the step 1106 is executed, the character string closer to the present position is displayed. In other words, when the name "Tokyo" and the name "Marunouchi 2" overlap, "Tokyo" is displayed, and when the name "Hitotsubashi" and "Ohtemachi" overlap "Ohtemachi" is displayed. The explanation given above deals with the method of selecting and displaying the character strings when display of the character strings overlap, but there is still another method which replaces display of the overlapping character strings by small fonts and displays them as shown in FIGS. 39A and B. In other words, when overlap of the character strings is judged as existing at the step 1102 in FIG. 4, these character strings are displayed in the font size smaller than the designated font size. If the designated font size of characters is 24×24 pixels, for example, display is made in the font size of 16×16 pixels or 12×12 pixels Since overlap of the character strings becomes smaller as shown in FIG. 39B in this case, recognition performance of the character strings can be improved. Next, whether or not the same character string, which expresses the same characters in the same sequence, exists in the character strings is judged (step 1107). When the same character string is judged as existing, the distance between the character strings is then calculated (step 1108). Here, the term "distance between the character strings" represents the difference of the position data of the characters put on the map data or the difference of the position data of the characters when the character strings are displayed on the bird's-eye view map. To calculate the distance, it is advisable to use one point representing the character string, that is, the upper left end point or the central point of the character string. Whether or not the distance between the character strings so calculated falls within a predetermined area is judged (step 1109) and when the result proves YES, the character strings in the proximity of the present position are buffered (step 1110). The operation example will be explained with reference to FIGS. 40A, B and C. Under the initial state shown in FIG. 40A, four character strings representing an interchange exist. The distances between these character strings are calculated as shown in FIG. 40B, and the character strings in the proximity of the present position, which has small distances, are selected, while both character strings are selected for those having large distances. In consequence, the character strings are displayed as shown in FIG. 40C. As can be clearly understood from these drawings, the character strings which are not necessary as the information are omitted and only the character strings which are absolutely necessary are left. Therefore, the driver can more easily recognize them.

Figure 15:
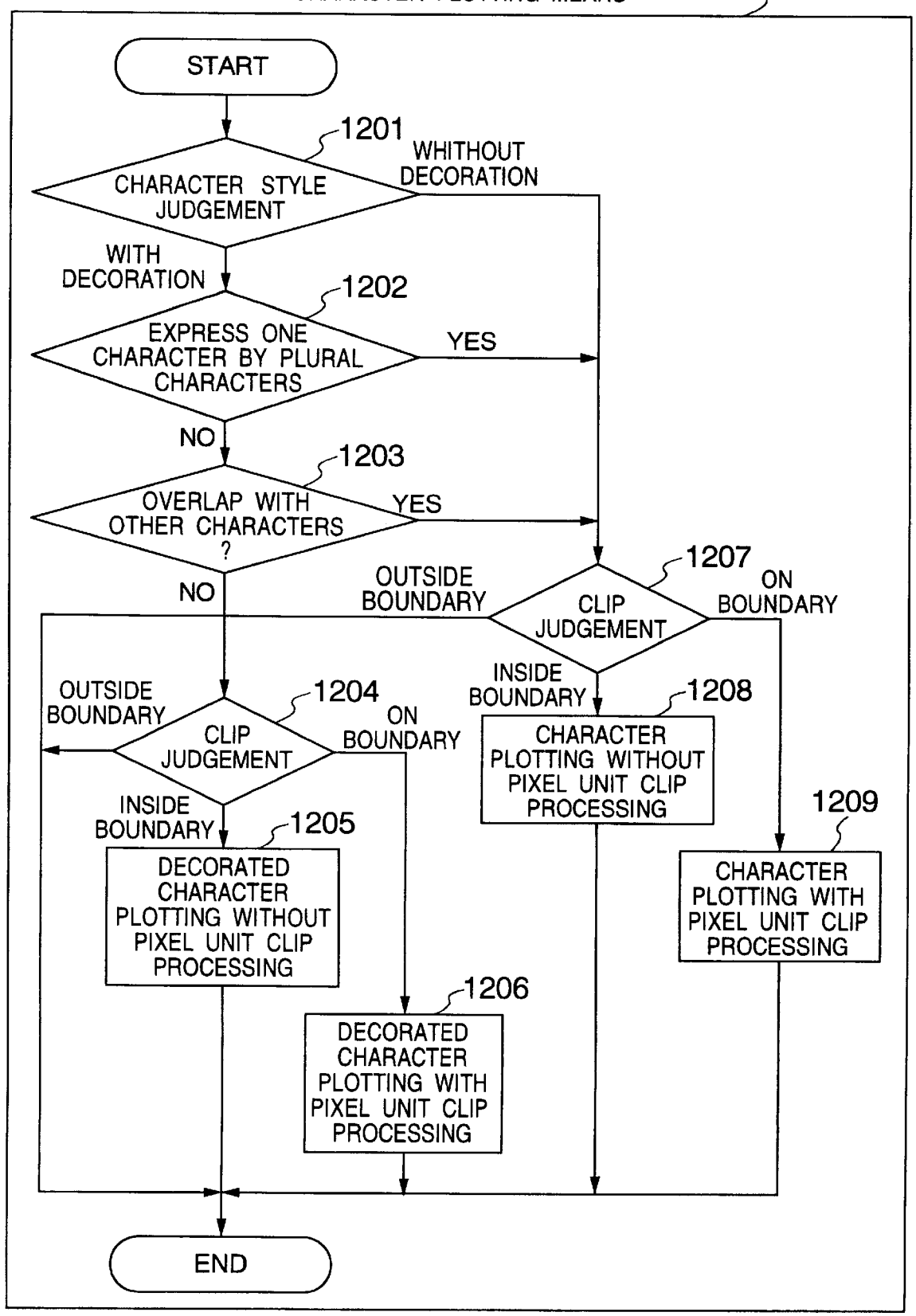
FIG. 15 is a flowchart of character plotting means.

Next, the character plotting means 1185, which can be inserted as a sub-routine to the final step of the flowchart shown in FIG. 14, will be explained concretely with reference to FIG. 15.

Here, whether or not decorated characters, or the like, are designated as a character style is first judged (step 1201). The decorated characters include bold-faced characters having a thick character line so as to highlight the characters and fringed characters having a background color or a frame of a designated specific color around the lines constituting a given character in order to have the character more comprehensible when it is displayed in superposition in a region where a large number of lines and planes are displayed as the background. Reference numeral 2181 in FIG. 18A represents an example of such a fringed characters This fringed character can be plotted in the following way. First, character plotting is effected for a character to be fringed at a position of one dot 2182 (FIG. 18B) from the upper left of the coordinates in which the object character is to be plotted, in the background color. Further, character plotting is effected eight times, in total, in the same way by using the background color at an upward position by one dot 2183 (FIG. 18C), at a right upward position by one dot 2184 (FIG. 18D), at a left position by one dot 2185 (FIG. 18E), at a right position by one dot 2186 (FIG. 18F), at a left downward position by one dot 2187 (FIG. 18G), at a downward position by one dot 2188 (FIG. 18H) and at a right downward position by one dot 2189 (FIG. 18I), respectively Finally, the intended character is plotted at the designated coordinates position in the designated color (2191 in FIG. 18J). As a modified example of the fringed characters, there is a method which displays the background color in the predetermined directions of the character, for example, to the right, down and right downward, or a frame having a designated specific color.

Figure 17A:
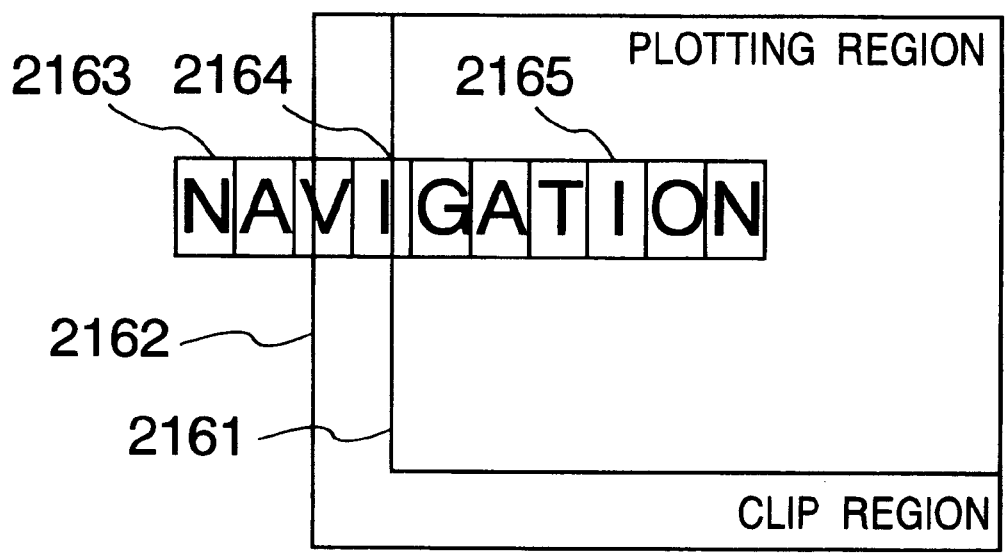
FIGS. 17A and 17B show an embodiment for character clipping processing.
Figure 17B:
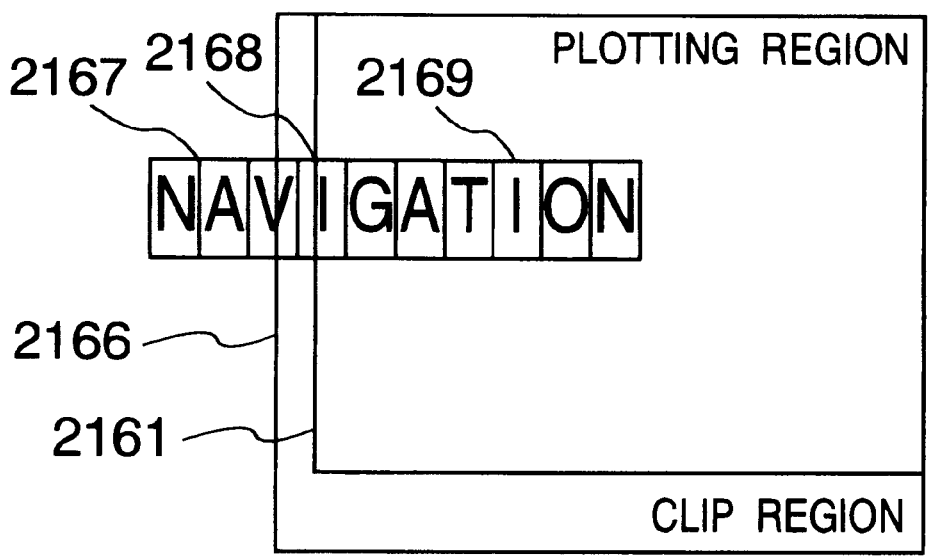
Figure 19:
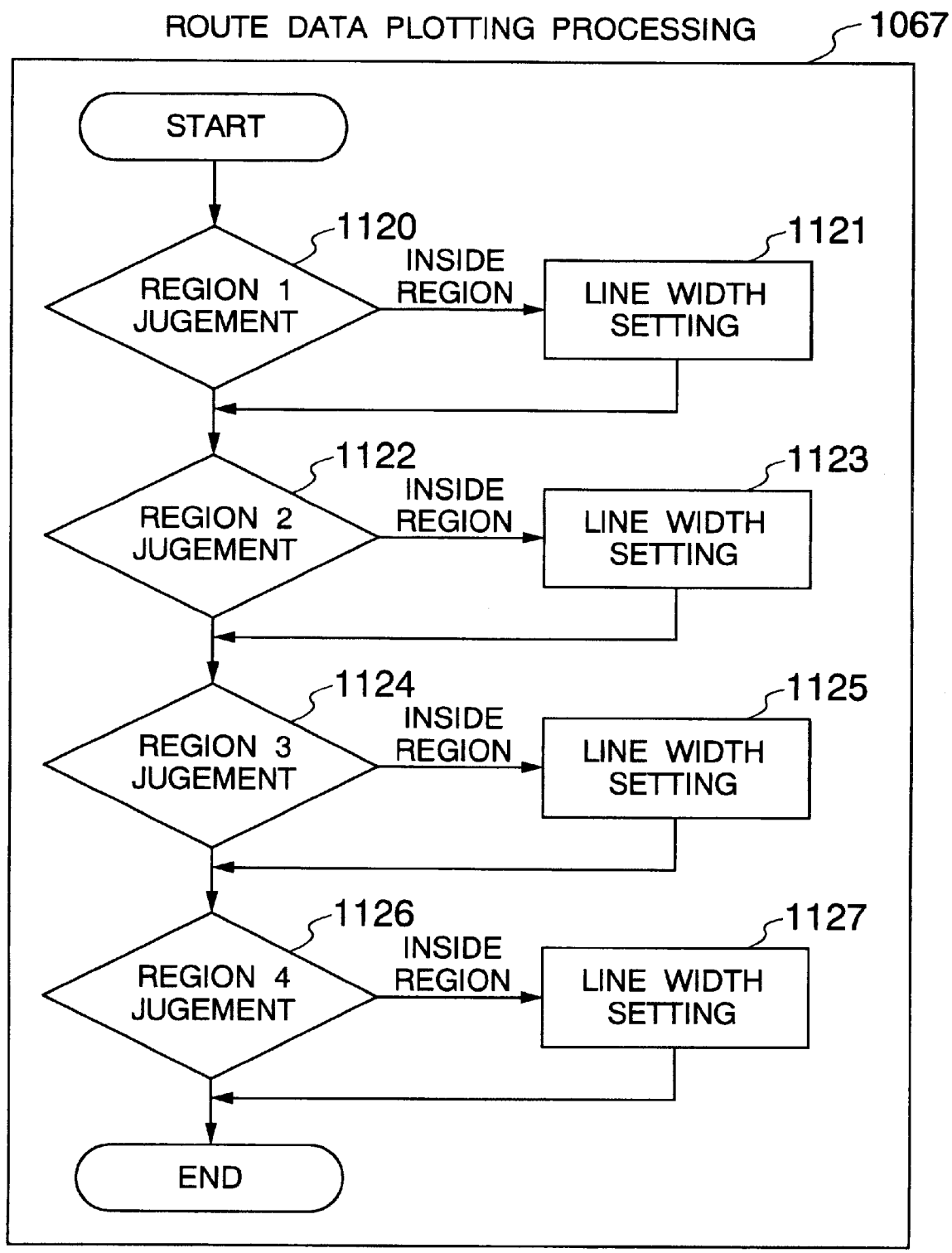
FIG. 19 is a flowchart of a route display in bird's-eye view map display.

When the character is not judged as the decorated character in the character style judgement, the relation between the designated character and the clip region is judged by clip judgement (step 1207) so as to call the character plotting routine having, or not having, the clip in the pixel unit. The clip processing routine compares the character plotting start coordinates, for example, the left lower end point of the designated character, with the clip region and judges whether or not the left lower end point of this character is contained in the clip region 2162, the plotting region 2161 or other regions, as shown in FIGS. 17A and B. By the way, when the character to be plotted is the standard character, the clip region is expanded to the left by the width of the character and in the down direction by the height of the character from the plotting region. Assuming that the height of the standard character and the half-size character is h, the width of the standard character is w, the width of the half-size character is w', the left lower end point of the plotting region is (x1, y1) and the right upper end point is (x2, y2), for example, the left lower end point of the clip region in the standard character is (x1−w, y1−h), its right upper end point is (x2, y2) the left lower end point of the clip region in the half-size character is (x1−2', y1−h) and its right upper end point is (x2, y2). The left lower end points of the characters indicated by reference numerals 2163 and 2167 in FIGS. 17A and B exist outside the clip region. Therefore, the characters are clipped by clipping and nothing is plotted. The left lower end points indicated by reference numerals 2164 and 2168 in FIGS. 17A and B exist inside the clip region but are not contained in the plotting region. Therefore, the routine for executing the clip processing on the pixel unit is called, and character plotting is reliably executed, though the processing speed is not high (step 1209). The left lower end points of the characters indicated by reference numerals 2165 and 2169 in FIGS. 17A and B are contained in the plotting region. Therefore, the clip processing is omitted in the pixel unit, and character plotting is executed at a high processing speed (step 1208). Since the processing is executed in this way, high speed character plotting can be accomplished. Incidentally, the character plotting start coordinates are hereby set to the left lower end point of the character, but when the character plotting start coordinates are set to the position offset by a predetermined value from this left lower end point of the characters the offset distance may be added to the coordinates values of the plotting region and the clip region.

When the character is judged as having decoration in the character style judgement 1201, whether or not the designated character constitutes on character by a plurality of characters is judged (step 1202). As an example of one character string constituted by a plurality of characters, there is a character of the shape having a size which exceeds the size that can be expressed by one character as shown in FIG. 16A. When decoration is applied in a character unit to such a character string, a fringe 2143 is displayed at the boundary of a respective character 2142 in the case of a fringed characters for example, as shown in FIG. 16B, and display quality drops. Therefore, when a plurality of characters are judged as constituting one character string, the flow jumps to the routine which does not put decoration to the characters. Incidentally, there is a method which examines the character codes and judges that a plurality of characters constitute one character string when the codes are within a predetermined region, as a method of judging that a plurality of characters constitute one character string. Accordingly, in the case of the decorated characters such as the fringed characters, too, the fringe 2143 is not displayed at the boundary of each character 2142 and display quality can be improved. The operations after the clip judgement 1207 are the same as in the foregoing explanation.

Next, when a plurality of characters are not judged as constituting one character string at the step 1202, whether or not the designated character is displayed in superposition with other characters is judged (step 1203). Here, whether or not the designated character overlaps with a plurality of characters that constitute one character is evaluated The decorated characters such as the fringe characters intend to display more comprehensively those characters which overlap with the background information such as the lines and planes. When the decorated character such as the fringed character is displayed when overlapping characters exists the overlapping character string becomes difficult to discriminate There is also the case where one symbol, or the like, is displayed by combining the character constituting one character by a plurality of characters with character to be displayed in superposition with the former, and in such an application, the characters to be displayed in superposition need not be the decorated characters. Therefore, whether or not the designated character is displayed in superposition with other characters is examined at the step 1203, and when it is, the flow jumps to the routine which does not put decoration to the character. In consequence, display such as shown in FIG. 16D is executed, and intended display can be accomplished The operations after the clip judgement 1207 is the same as in the foregoing embodiment.

Next, when the designated character is not judged as being displayed in superposition with other characters at the step 1203, plotting of the decorated characters is executed. The relation between the designated character and the clip region is judged by the clip judgement (step 1204) and the character plotting routine having, or not having, the clip in the pixel unit is called. The clip processing routine compares the plotting start coordinates of the character such as the left lower end point of the designated character with the clip region, and judges whether or not the left lower end point of the character is contained in the clip region 2162, the plotting region 2161 or other regions in FIGS. 17A and B. When, for example, the height of the character is h, the width of the character is we the left lower end point of the plotting region is (x1, y1) and the right upper end point is (x2, y2), the lower end point of the clip region is (x1−w, y1−h) and the right upper end point is (x2, y2). When the left lower end point of the character exists outside the clip region, it is excluded by clipping and nothing is plotted. When the left lower end point of the character exists inside the clip region and is not contained in the plotting regions plotting of the decorated character is reliably executed by the clip processing in the pixel unit, though the processing speed is not high (step 1206). When the left lower end point of the character is contained in the plotting regions the clip processing in the pixel unit is omitted, and plotting of the decorated character is executed at a high processing speed (step 1205). When such a processing is executed, character plotting can be accomplished at a high speed. In this explanations the plotting start coordinates of the character are set to the left lower end point of the characters but when the plotting start coordinates of the character are set to a point offset by a certain predetermined value from this left lower end point of the character, this offset may be added to the coordinates value of the boundary between the plotting region and the clip region.

Next, whether or not the route data exists in the plotting data is judged (step 1066). When the route data is judged as existing in the route memory means, the processing shifts to the route data plotting processing (step 1067). The route data plotting processing 1067 divides the region in which the map is practically displayed into a plurality of zones in the depth-wise direction, and applies necessary processing in each region. The explanation will be given hereby on the case where the region is divided into four zones. First, whether or not the route data exists in the foremost front side region 1 inclusive of the present position is judged (step 1120) and when the result proves YES, the line width for displaying the route is set to the greatest width (e.g. 9-dot width; step 1121). Next, whether or not the route data exists in the region 2 above the region 1 is judged (step 1122) and when the result proves YES, the line width representing the route is set to the width smaller than that of the step 1121 but greater than that of the step 1125 (e.g. 7-dot widths step 1123). Next, whether or not the route data exists in the region 3 above the region 2 is judged (step 1124), and when the result proves YES, the line width representing the route is set to the width smaller than that of the step 1123 but greater than that of the step 1127 (e.g. 5-dot width; step 1125). Finally, whether or not the route data exists in the deepest region 4 is judged (step 1126) and when the result proves YES, the line width representing the route is set to a width smaller than that of the step 1125 (e.g. 3-dot width, step 1127). When plotting is carried out in this manner, the forehand route can be displayed thinly and the depth route, thickly, as shown in FIG. 42B unlike the prior art system which does not have the feel of three-dimensional depth shown in FIG. 42A. Accordingly, the driver can recognize very naturally the route data. Incidentally, the explanation is hereby given on the system which divides the region and changes the line width for each divided region. However, it is also possible to employ the method which displays the routes close to the present position by a thicker line and the routes away from the present position by a thinner line.

Figure 20:
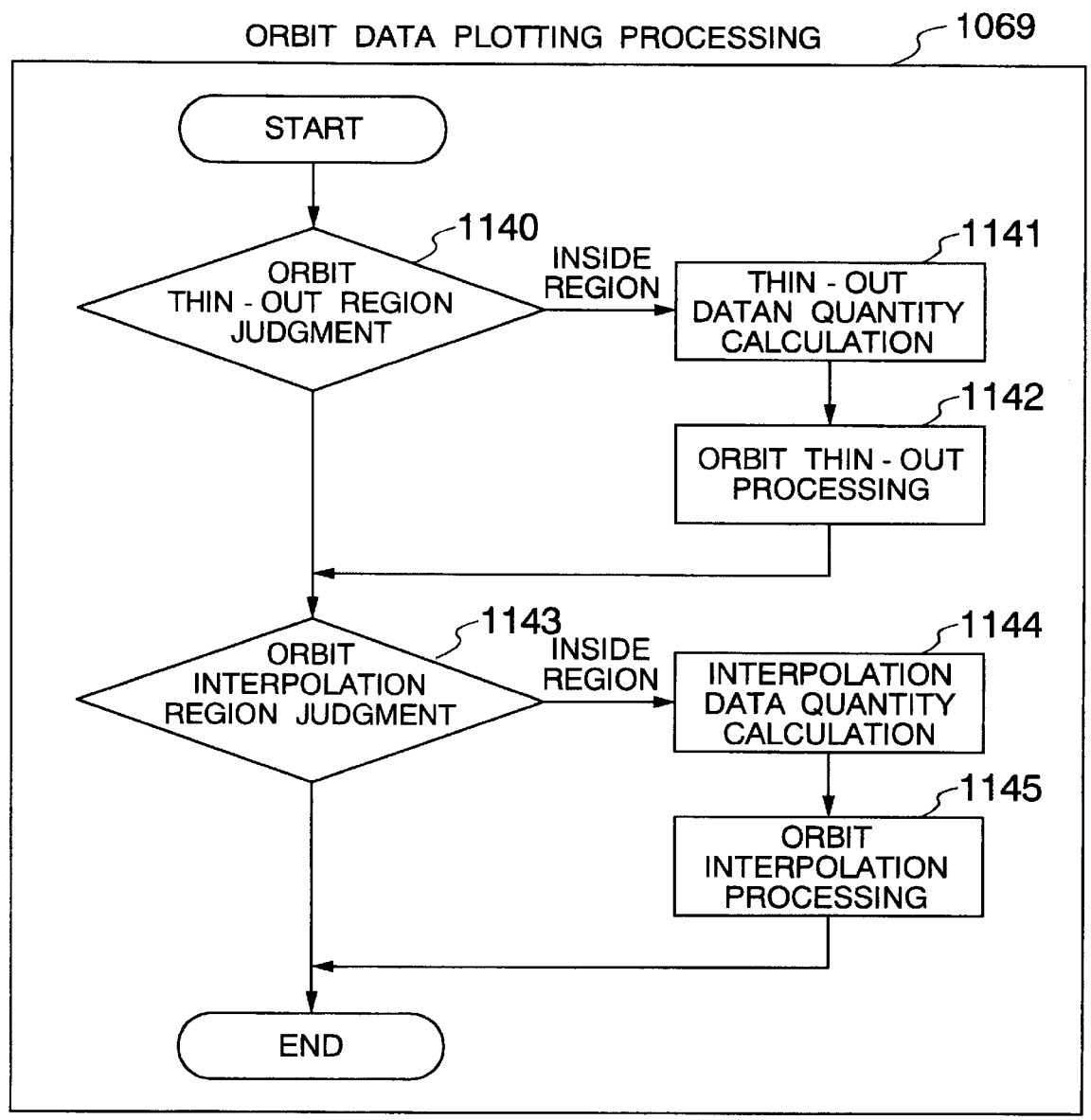
FIG. 20 is a flowchart of orbit display in bird's-eye view map display.

Next, whether or not the orbit data exists in the plotting data is judged (step 1068). When the orbit data is judged as existing, the processing shifts to the orbit data plotting processing (step 1069) shown in FIG. 20. Incidentally, this orbit data is stored in the orbit memory means 69 storing therein the driving position in a predetermined distance interval. Generally, when the orbit data is displayed on the map by bird's-eye view map displays the gap of the points representing the orbit near the present position becomes great, whereas the gap of the points representing the orbit becomes small at the positions away from the present position. Therefore, there occurs the case from time to time where the points of the orbit overlap with one another. To solve this problem, in the orbit data plotting processing (step 1069), orbit thinning-out region judgement means (step 1140) for judging whether the region for which the orbit is to be plotted is away from the present position, switches the processing to the step 1141 if the orbit is the orbit of the position away from the present position. Thinning-out data quantity calculation means (step 1141) decides the thinning-out quantity of the orbit data displayed so that the gap of the points representing the orbit becomes easily comprehensible when bird's-eye view map display is executed (step 1141). The orbit thinning-out processing (step 1142) thins out the orbit data, which need not be displayed, from the data to be displayed in accordance with the thinning-out quantity of the orbit data determined by the step 1141, and prevents the orbit data from being displayed for the positions away from the present position. Next, the orbit interpolation region judgement means (step 1143) for judging if the region for which the orbit is to be plotted is near the present position, judges whether or not the orbit to be displayed is near the present positions and when the orbit is judged as being near the present positions the processing shifts to the step 1144. The interpolation data quantity calculation means (step 1144) decides the orbit data quantity to be interpolated afresh between the orbit and the orbit so that the gap of the points representing the orbit reaches the comprehensible data quantity when bird's-eye view map display is executed (step 1144). The orbit interpolation processing sets the orbit data to be afresh displayed between the orbit and the orbit and on the driving road in accordance with the interpolation quantity of the orbit data decided by the step 1144, prevents the interval between the orbit data from becoming too great and displays comprehensibly the roads that have been taken in the proximity of the present position (step 1145).

Figure 43A:
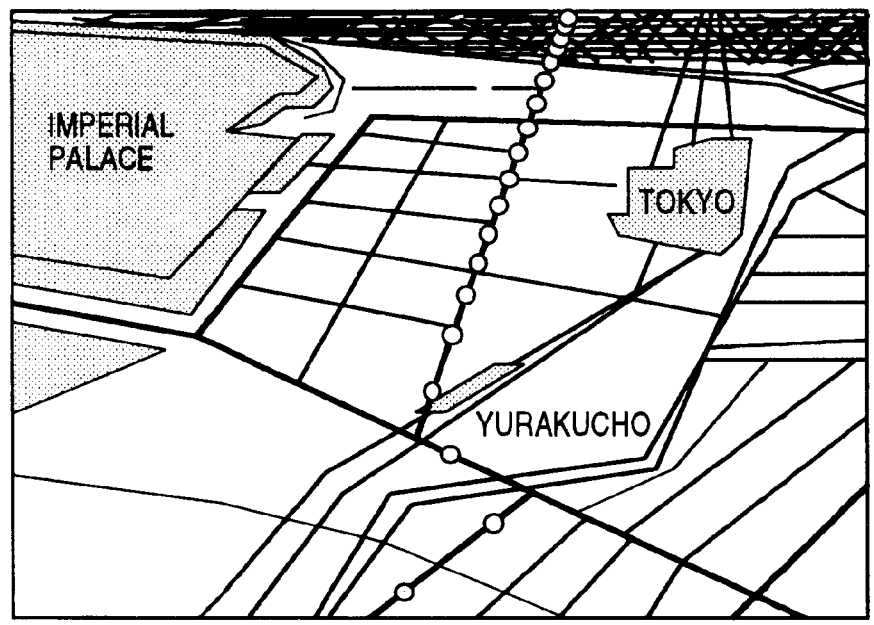
FIGS. 43A and 43B show an embodiment for orbit display in bird's-eye view map display.
Figure 43B:
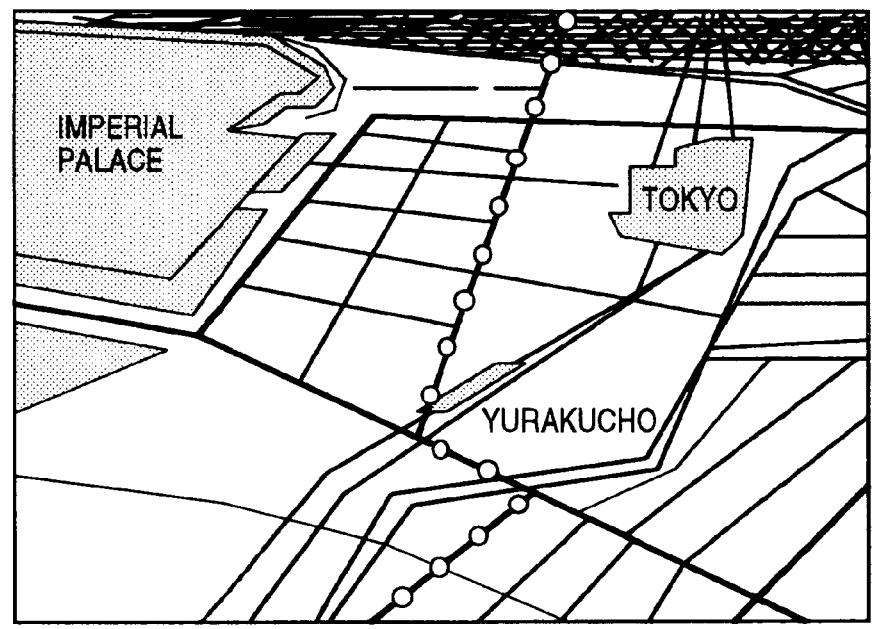

Next, the orbit display examples are shown in FIGS. 43A and B. In the prior art system, the orbit data represented by the circle ○ is displayed in such a manner as to broaden at portions in the proximity of the present position and to narrow at portions away from the present position as shown in FIG. 43A. In the present system, on the other hand, the orbit data is displayed in the equal gaps at the portions in the proximity of the present position and at the portion away from it as shown in FIG. 43B. Accordingly, display quality can be improved and the roads containing the orbits can be more easily recognized. Therefore, the orbit recognition factor by the driver can be improved.

Figure 21:
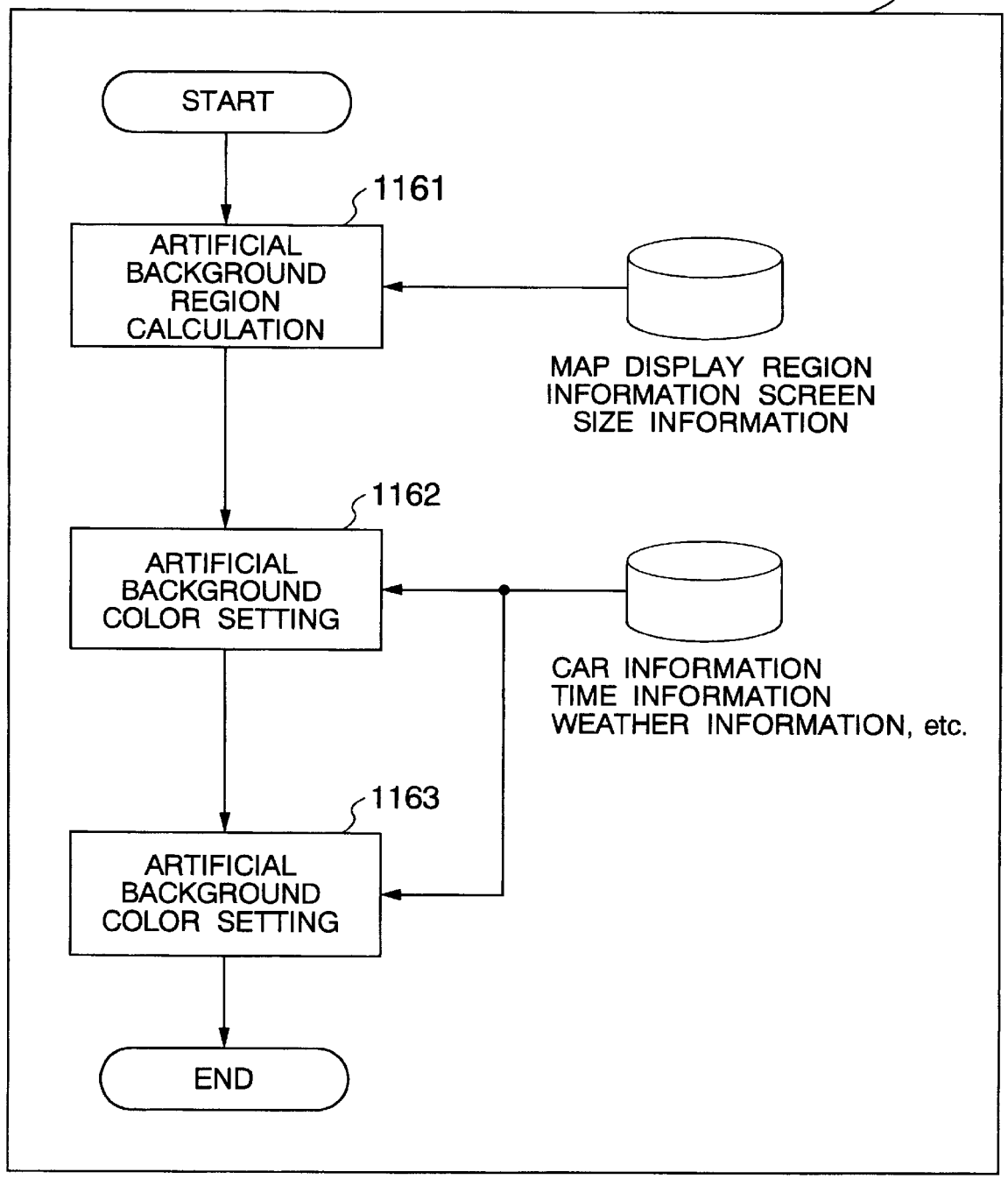
FIG. 21 is a flowchart of artificial background display in bird's-eye view map display.
Figure 44A:
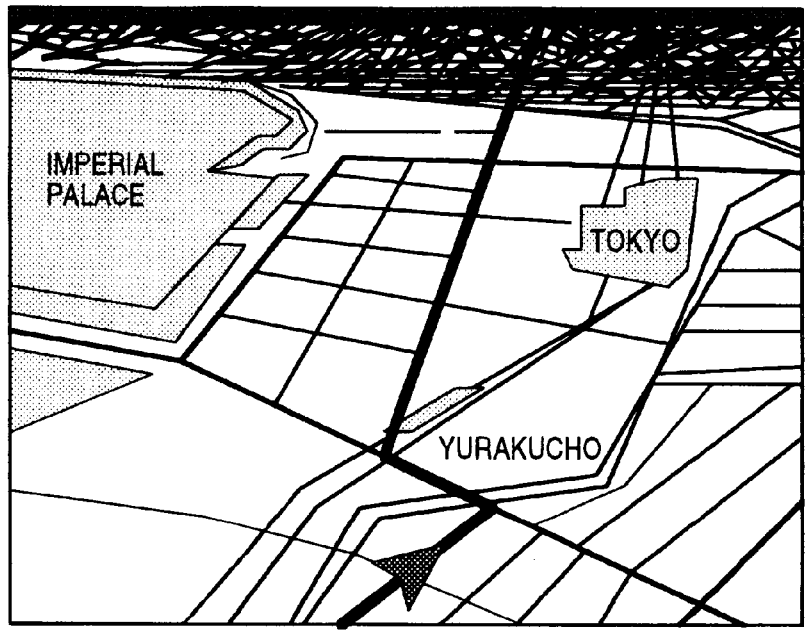
FIGS. 44A and 44B show an embodiment for artificial background display in bird's-eye view map display.
Figure 44B:
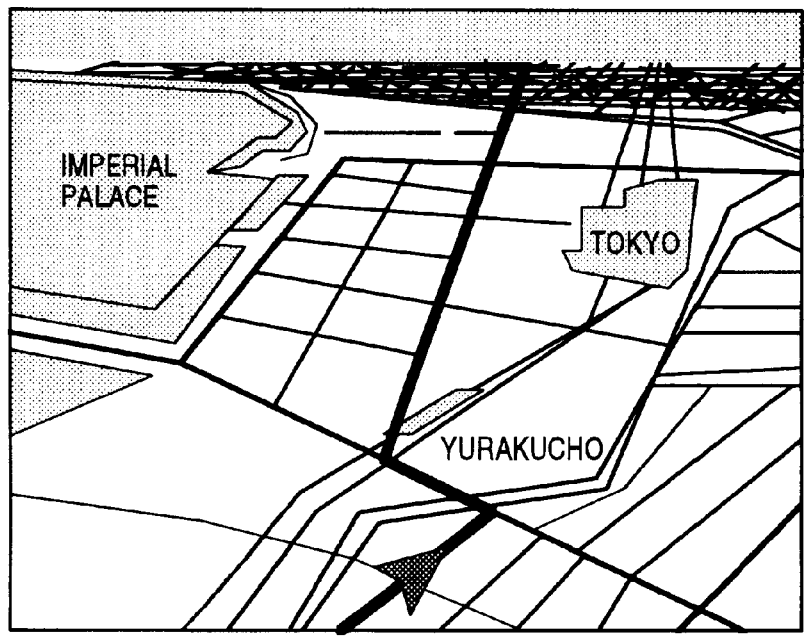

The explanation given above explains the plotting processing method of the objects constituting the bird's-eye view map. Next, the method of plotting the artificial background such as the sky and the horizontal line will be explained. One of the problems encountered in bird's-eye view map is that when the map of the far places from the present position is displayed as shown in FIG. 44A, its reduced scale becomes small, an extremely enormous quantity of map data are necessary in plotting, an elongated time is necessary for display and high speed response cannot be obtained. To solve this problem, the Applicant of the present invention has proposed the method which limits the far region from the present position to be displayed in the map so as to reduce the map data quantity and displays insteads the artificial objects such as the horizontal line, the sky, and so forth. More concretely, the display region judgement means 81 shown in FIG. 8 decides the region to be displayed practically on the map. After the bird's-eye view map is displayed through the subsequent steps 82 to 85, the artificial background setting means 86 sets the data of the artificial background. The content of this processing will be explained with reference to FIG. 21. First, an artificial background region calculation (step 1161) reads out the region information whose map is decided to be displayed by the display region judgement means 81, and decides the region for which the artificial background is displayed, from the difference between this region information and the screen size information. Next, artificial background color decision means (step 1162) and artificial background pattern setting means (step 1163) decide the colors of the background region and its pattern on the basis of various information such as the car information and the time information. The method of deciding the colors on the basis of the car information will be hereby explained by way of example. The car information S10 is inputted to the processor portion through the car LAN 11. When the small lamp is lit at this time, it means that the surroundings are dark and the time can be judged as night. Therefore, the artificial background is displayed in black or grey. When the small lamp is not lit, the time can be judged as daytime. Therefore, the artificial background is displayed in blue. When the blue color cannot be displayed due to the color palette, it is advisable to conduct dither processing which sets the pattern so that the blue color and the white color are sequentially displayed.

Next, another embodiment which obtains the similar effect by a different means will be explained. In the navigation apparatus, the date and the time can be acquired by receiving and analyzing the signals from the GPS satellite. The artificial background can be displayed by using this information so that the blue color is displayed when the time is judged as the daytime and the black color or the grey when it is judged as the night. The artificial background may be displayed in read representing the morning or evening glow for the morning or the evening. Next, still another embodiment for obtaining the similar effect by a different means will be explained. This is the system which displays the artificial background in the blue when it is fine and in the grey when it is rainy or cloudy by using the weather information contained in the information S9 received by the traffic information receiver 10 Since the artificial background is displayed in match with the surrounding conditions by these means, the driver can easily judge what is represented by the artificial background.

Figure 45A:
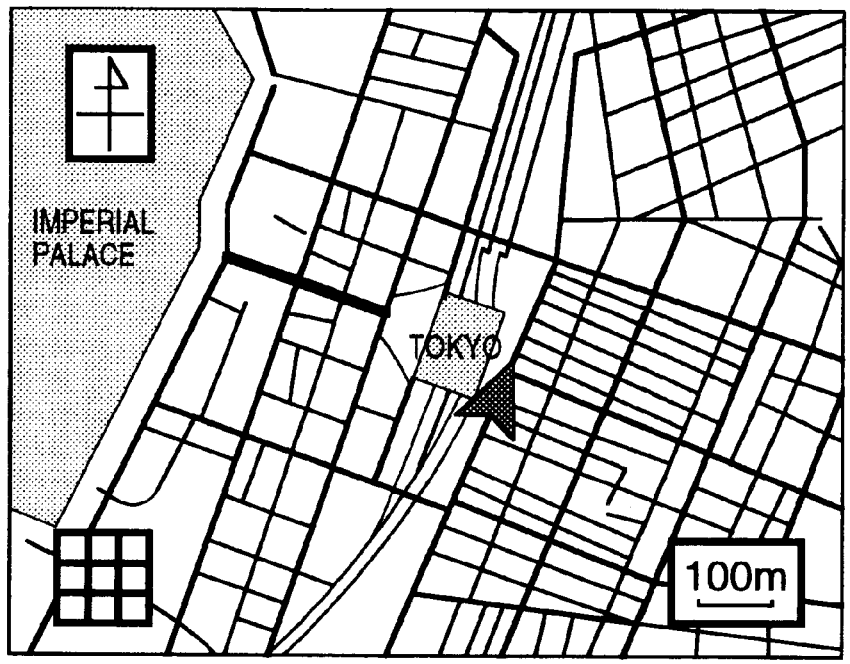
FIGS. 45A and 45B show an embodiment for mark display in bird's-eye view map display.
Figure 45B:
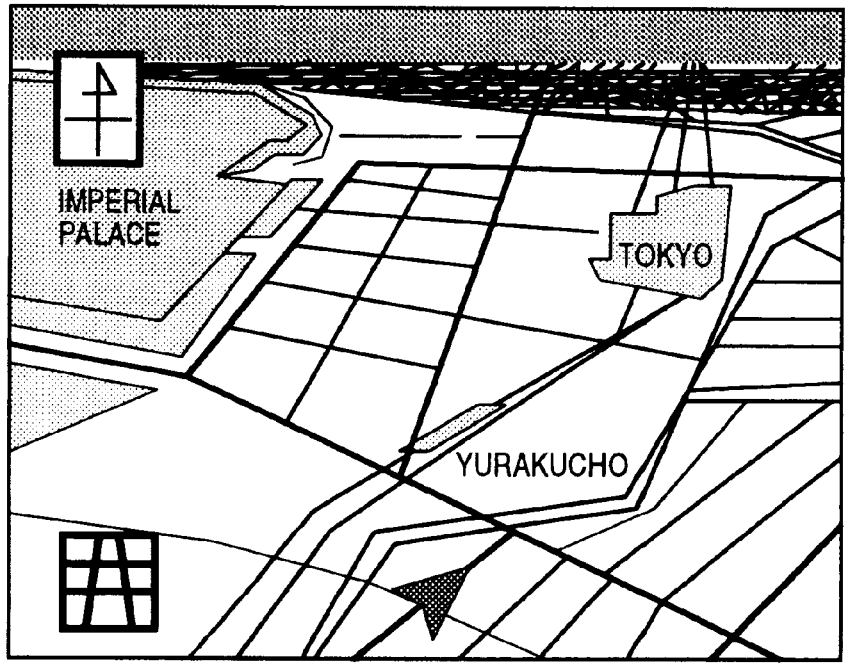
Figure 46A:
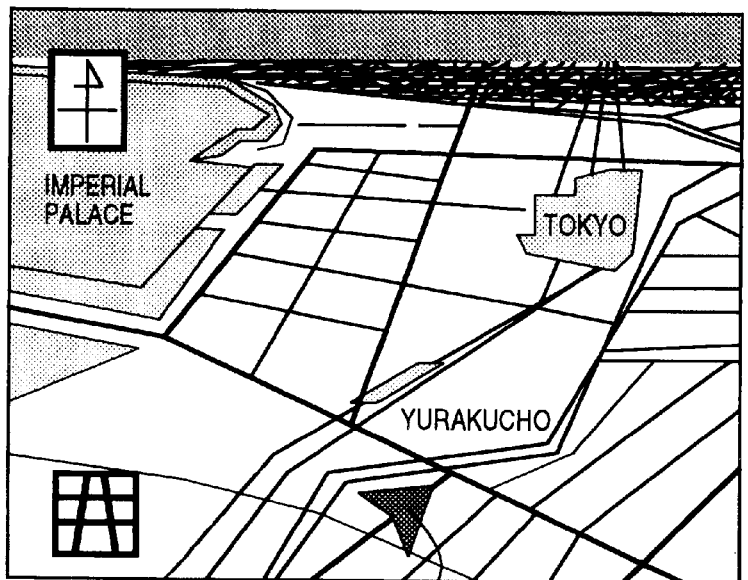
FIGS. 46A and 46B show an embodiment for present position mark display in bird's-eye view map display.
Figure 46B:
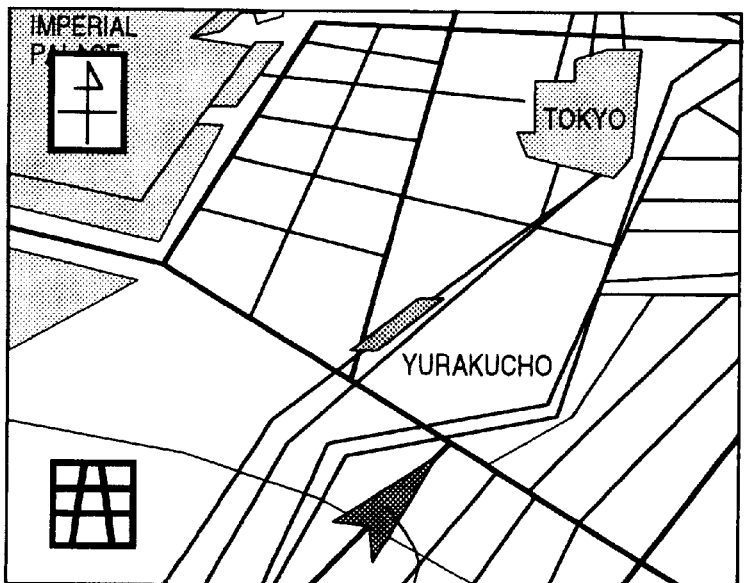

Next, display means for the additional information such as the means to be displayed in superposition with the bird's-eye view map will be explained. The navigation apparatus for displaying the bird's-eye view map improves the user interface by displaying the information representing by which system the map presently displayed is plotted, in superposition with the map. Menu plotting means 70 for executing this processing will be explained with reference to FIG. 22. The content of the user's operation is transmitted by the input device 5 to the user operation analysis means 61, where the content is analyzed. When the necessity of display by the menu plotting means 70 is judged as existing, the content is transmitted to the menu plotting means 70 by using a message. Receiving this messages the menu plotting means starts its processing and judges whether or not the request of this message is the display request of the plan view map (step 1180) When the message is judged as the one requesting the display of the plan view map, a mark representing that the plan view map such as shown at the lower left of FIG. 45A is now being displayed is displayed (step 1181). Further, the mark representing the reduced scale of the map displayed at present is displayed (at the lower right of FIG. 45A, step 1182). When the message is not the one described above, whether or not the request of the message is the display request of the bird's-eye view map is judged (step 1183). When it is judged as the message requesting display of the bird's-eye view map, the mark representing that the bird's-eye view map is now being displayed, such as the one shown at the lower left of FIG. 45B, is displayed (step 1184). Further, the mark representing the reduced scale of the map presently displayed is turned off (step 1185). When the message is not the one described above (step 1186), whether or not the request of the message is the change request of the projection angle in the bird's-eye view map is judged (step 1186). When it is judged as the message requesting the change of the projection angle, the shape of the mark representing the present position is changed in accordance with the projection angle in the same way as the present position mark in FIGS. 45A and B (step 1187). When the projection angle Θ is close to 0° at this time, that is, when the map is close to the plan view, the present position mark is brought into conformity with the present position mark shape in the plan view map display, and as the projection angle Θ approaches 90°, the mark subjected to perspective conversion by the projection angle Θ at which the present position mark is set is used for display As a result of the processing described above, the driver can easily judge the display mode of the map and the display region, so that recognition performance can be improved.

The foregoing embodiments can reduce overlap of the character strings in the bird's-eye view map display, eliminate the necessary for the user to estimate what is the character string displayed, from the relation between the preceding and subsequent character strings, and can make the character strings and the symbols more easily comprehensible Because the bird's-eye view map is easily recognizable even while the driver is driving, safety can be further improved.

Since display of the same character string is eliminated in the bird's-eye view map displays the bird's-eye view map can be displayed more simply In consequences the bird's-eye view map can be recognized more easily even while the driver is driving, and safety can be further improved.

Because the route near the visual point is displayed more thickly than the routes away from the visual point in the bird's-eye view map display, the map can be expressed more three-dimensionally Therefore, the user can easily acquire the feel of depth of the bird's-eye view map, and a more comprehensible map can be obtained.

Further, because the dot strings representing the driving orbit in the bird's-eye view map display are expressed with suitable gap at both portions away from the visual point and portions near the visual point, the phenomenon in which the gaps of the dot strings representing the orbit becomes great, that occurs in the proximity of the visual point, as well as the phenomenon in which the gaps of the dot strings representing the orbit becomes narrower than necessary, that occurs at portions away from the visual point, can be avoided, and display quality of the bird's-eye view map and the driving orbit can be improved.

Display quality of the patterns contained in the lines and the planes in the bird's-eye view map display somewhat drops, but because the display time can be shortened, the time necessary for displaying the bird's-eye view map becomes shorter. Therefore, the re-display cycle of the bird's-eye view map becomes shorter, and the bird's-eye view map can be displayed more really.

The artificial background representing the virtual sky and horizontal line are so displayed as to correspond to the surrounding condition in the bird's-eye view map display. Therefore, the user is not perplexed unnecessary.

Further, the user can easily judge that the map presently displayed is the bird's-eye view map or the plan view map. Since the present condition is displayed in such a manner as to correspond to the change of the visual point, the navigation apparatus becomes easier to use and safety can be improved.

Since the destination is always displayed in a predetermined direction the driver can drive the car while confirming always the direction of the destination.

Since the information desired by the driver is preferentially displayed, the necessity for the driver to conduct unnecessary operations decreases during driving safety can be therefore improved further.

We claim:

1. A map display apparatus comprising:

memory means for storing map data necessary for plotting a map of a predetermined region;

character data selection means for selecting a character string having a predetermined attribute from character data read out from said memory means;

perspective conversion means for perspective converting the character data selected by said character data selection means to produce perspective-converted character data;

character data display means for displaying the perspective-converted character data produced by said perspective conversion means by a bird's-eye view display; and vector data display means for executing perspective conversion for vector data read out from said memory means and displaying it by a bird's-eye view display;

wherein said character data selection means includes:

character overlap judgement means for judging overlap between different character strings; and character string selection means for selecting a character string having a predetermined attribute for those character strings which are judged as overlapping by said character overlap judgement means.

2. A map display apparatus comprising:

memory means for storing map data necessary for plotting a map of a predetermined region;

character data selection means for selecting a character string having a predetermined attribute from character data read out from said memory means;

perspective conversion means for perspective converting the character data selected by said character data selection means to produce perspective-converted character data;

character data display means for displaying the perspective-converted character data produced by said perspective conversion means by a bird's-eye view display; and vector data display means for executing perspective conversion for vector data read out from said memory means and displaying it by a bird's-eye view display;

wherein said character data selection means includes:
character overlap judgement means for judging overlap between different character strings; and
character string selection means for selecting a character string in the proximity of a visual point for those character strings which are judged as overlapping by said character overlap judgement means.

3. A map display apparatus comprising:

memory means for storing map data necessary for plotting a map of a predetermined region;

character data selection means for selecting a character string having a predetermined attribute from character data read out from said memory means;

perspective conversion means for perspective converting the character data selected by said character data selection means to produce perspective-converted character data;

character data display means for displaying the perspective-converted character data produced by said perspective conversion means by a bird's-eye view display; and vector data display means for executing perspective conversion for vector data read out from said memory means and displaying it by a bird's-eye view display;

wherein said character data selection means includes:
character overlap judgement means for judging overlap between different character strings; and
font substitution means for a smaller font for those character strings which are judged as overlapping by said character overlap judgement means.

4. A map display apparatus according to any of claims 1 through 3, wherein said character overlap judgement means judges overlap between character strings by using a rectangular region information circumscribed with the character strings.

5. A map display apparatus according to any of claims 1 through 3, wherein said character overlap judgement means judges overlap between character strings by using a rectangular region information of a rectangle situated more inward by a predetermined distance from a rectangle circumscribed with the character strings.

6. A map display apparatus according to any of claims 1 through 3, wherein said character overlap judgement means judges overlap by using a polygonal region information of a polygon situated more inward by a predetermined distance from a polygon encompassing the character strings.

7. A map display apparatus comprising:

memory means for storing map data necessary for plotting a map of a predetermined region;

same character string selection means for selecting the same character strings from character data read out from said memory means;

character data selection means for selecting a predetermined character string from the same character strings selected by said same character string selection means;

perspective conversion means for perspective converting the character data selected by said character data selection means to produce perspective-converted character data;

character data display means for displaying the perspective-converted character data produced by said perspective conversion means by a bird's-eye view display; and vector data display means for executing perspective conversion for vector data read out from said memory means and displaying it by a bird's-eye view display.

8. A map display apparatus according to claim 7, wherein said character data selection means selects a character string in the proximity of a visual point.

9. A map display apparatus according to claim 7, wherein said same character string selection means judges character strings as the same character strings when the distance between the character strings that are being judged is within a predetermined range.

10. A map display apparatus according to claim 7, wherein said same character string selection means judges character strings as the same character strings when the character strings that are being judged are subjected to perspective conversion and are displayed, and when the distance between them is within a predetermined range.

11. A map display apparatus comprising:

memory means for storing map data necessary for plotting a map of a predetermined region;

map display means for displaying a bird's-eye view map by using map data read out from said memory means;

driving orbit memory means for storing a car's own driving orbit; and driving orbit display means for executing perspective conversion of a plurality of routes stored in said driving orbit memory means to produce perspective-converted routes and displaying said perspective-converted routes in such a manner that the gaps between orbit point strings become equidistant when said perspective-converted routes are displayed by a bird's-eye view display.

12. A map display apparatus according to claim 11, wherein said driving orbit display means thins out the orbit data so that orbit point strings become equidistant when a plurality of orbits stored in said driving orbit memory means are subjected to perspective conversion and are displayed by bird's-eye view display, and displays the orbit data.

13. A map display apparatus according to claim 11, wherein said driving orbit memory means calculates interpolation points of orbit data so that the orbit point strings are equidistant when a plurality of orbits stored in said driving orbit memory means are subjected to perspective conversion and are displayed, and displays them.

14. A map display apparatus comprising:

memory means for storing map data necessary for plotting a map of a predetermined region;

map data display means for executing perspective conversion of each apex when a pattern exists in the map data read out from said memory means, and displaying the map data by using a pattern used for a plan view map display; and character data display means for executing perspective conversion for the character data read out from said memory means and displaying it by a bird's-eye view display.

15. A map display apparatus according to claim 14, wherein said map data display means includes means for executing perspective conversion of each apex of a vector when a pattern exists in the map data constituted by vector data, and displaying it by a vector display by using a pattern used for a plan view map display.

16. A map display apparatus according to claim 14, wherein said map data display means includes means for executing perspective conversion of each apex constituting a polygon when a pattern exists inside the polygon encompassed by polygonal data, and displaying the polygon by using a pattern used for a plan view map display.

17. A map display apparatus comprising:

memory means for storing map data necessary for plotting a map of a predetermined region;

map display means for selectively displaying either a bird's-eye view map or a plan view map by using the map data read out from said memory means;

mark selection means for selecting a respective mark to be displayed in superposition with the displayed bird's-eye view map and the displayed plan view map; and mark display means for displaying the selected mark in superposition with the displayed bird's-eye view map or the displayed plan view map.

18. A map display apparatus comprising:

memory means for storing map data necessary for plotting a map of a predetermined region;

map display means for displaying a bird's-eye view map and a plan view map by using the map data read out from said memory means;

mark selection means for selecting a mark in accordance with the map to be displayed in superposition with the map to be displayed; and mark display means for displaying the mark selected by said mark selection means in superposition with the bird's-eye view map and the plan view map.

19. A map display apparatus according to claim 18, wherein said mark selection means selects and displays a mark representing the plan view display during display of the plan view map, and selects and displays a mark representing the bird's-eye view display during display of the bird's-eye view map.

20. A map display apparatus according to claim 18, wherein said mark selection means changes the shape of the mark representing a present position in both the bird's-eye view map and the plan view map.

21. A map display apparatus according to claim 18, wherein said mark selection means changes the shape of the mark representing a present position in accordance with the position of a visual point or a projection angle in the bird's-eye view map.

22. A map display apparatus according to claim 18, wherein said mark selection means displays a mark representing a reduced scale of a map in the plan view map and does not display the mark representing the reduced scale of the map in the bird's-eye view map.

23. A map display apparatus comprising:

a memory which stores map data necessary for plotting a map of a predetermined region;

a character data selector which selects a character string having a predetermined attribute from character data read out from said memory;

a perspective converter which perspective converts the character data selected by said character data selector to produce perspective-converted character data;

a character data display which displays the perspective-converted character data produced by said perspective converter by a bird's-eye view display; and a vector data display which executes perspective conversion for vector data read out from said memory and displays it by a bird's-eye view display;

wherein said character data selector includes:

a character overlap judger which judges overlap between different character strings; and a character string selector which selects a character string having a predetermined attribute for those character strings which are judged as overlapping by said character overlap judger.

24. A map display apparatus comprising:

a memory which stores map data necessary for plotting a map of a predetermined region;

a character data selector which selects a character string having a predetermined attribute from character data read out from said memory;

a perspective converter which perspective converts the character data selected by said character data selector to produce perspective-converted character data;

a character data display which displays the perspective-converted character data produced by said perspective converter by a bird's-eye view display; and a vector data display which executes perspective conversion for vector data read out from said memory and displays it by a bird's-eye view display;

wherein said character data selector includes:

a character overlap judger which judges overlap between different character strings; and a character string selector which selects a character string in the proximity of a visual point for those character strings which are judged as overlapping by said character overlap judger.

25. A map display apparatus comprising:

a memory which stores map data necessary for plotting a map of a predetermined region;

a character data selector which selects a character string having a predetermined attribute from character data read out from said memory;

a perspective converter which perspective converts the character data selected by said character data selector to produce perspective-converted character data;

a character data display which displays the perspective-converted character data produced by said perspective converter by a bird's-eye view display; and a vector data display which executes perspective conversion for vector data read out from said memory and displays it by a bird's-eye view display;

wherein said character data selector includes:

a character overlap judger which judges overlap between different character strings; and a font substituter for a smaller font for those character strings which are judged as overlapping by said character overlap judger.

26. A map display apparatus comprising:

a memory which stores map data necessary for plotting a map of a predetermined region;

a same character string selector which selects the same character strings from character data read out from said memory;

a character data selector which selects a predetermined character string from the same character strings selected by said same character string selector;

a perspective converter which perspective converts the character data selected by said character data selector to produce perspective-converted character data;

a character data display which displays the perspective-converted character data produced by said perspective converter by a bird's-eye view display; and a vector data display which executes perspective conversion for vector data read out from said memory and displays it by a bird's-eye view display.

27. A map display apparatus comprising:

a memory which stores map data necessary for plotting a map of a predetermined region;

a map display which displays a bird's-eye view map by using map data read out from said memory;

a driving orbit memory which stores a car's own driving orbit; and a driving orbit display which executes perspective conversion of a plurality of routes stored in said driving orbit memory to produce perspective-converted routes and displays said perspective-converted routes in such a manner that the gaps between orbit point strings become equidistant when said perspective-converted routes are displayed by a bird's-eye view display.

28. A map display apparatus comprising:

a memory which stores map data necessary for plotting a map of a predetermined region;

a map data display which executes perspective conversion of each apex when a pattern exists in the map data read out from said memory, and displays the map data by using a pattern used for a plan view map display; and a character data display which executes perspective conversion for the character data read out from said memory and displays it by a bird's-eye view display.

29. A map display apparatus comprising:

a memory which stores map data necessary for plotting a map of a predetermined region;

a map display which selectively displays either a bird's-eye view map or a plan view map by using the map data read out from said memory;

a mark selector which selects a respective mark to be displayed in superposition with the displayed bird's-eye view map and the displayed plan view map; and a mark display which displays the selected mark in superposition with the displayed bird's-eye view map or the displayed plan view map.

30. A map display apparatus comprising:

a memory which stores map data necessary for plotting a map of a predetermined region;

a map display which displays a bird's-eye view map and a plan view map by using the map data read out from said memory;

a mark selector which selects a mark in accordance with the map to be displayed in superposition with the map to be displayed; and a mark display which displays the mark selected by said mark selector in superposition with the bird's-eye view map and the plan view map.

\* \* \* \* \*

UNITED STATES PATENT AND TRADEMARK OFFICE
CERTIFICATE OF CORRECTION

PATENT NO. : 5,917,436
DATED : June 29, 1999
INVENTOR(S) : "Yoshinorf Endo, Et al.

It is certified that error appears in the above-indentified patent and that said Letters Patent is hereby corrected as shown below:

On the title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 9 | 6 | 3 | 8 | 6 | 5 | 10/90 | Ichikawa et al. | 340 | 995 | |
| | | 5 | 7 | 3 | 2 | 3 | 8 | 5 | 03/98 | Nakayama et al. | 701 | 201 | 4/1/95 |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 2 | 4 | 2 | 0 | 5 | 0 | 10/87 | EPO | | | | |
| | | 0 | 3 | 7 | 8 | 2 | 7 | 1 | 07/90 | EPO | | | | |
| | | 7 | 1 | 6 | 0 | 8 | 4 | 5 | 06/95 | Japan | | | Abstract | |
| | | 0 | 6 | 6 | 0 | 2 | 9 | 0 | 06/95 | EPO | | | | |
| | | 0 | 6 | 7 | 8 | 7 | 3 | 1 | 10/95 | EPO | | | | |

Signed and Sealed this

Twenty-third Day of November, 1999

Attest:

Q. TODD DICKINSON

*Attesting Officer*  *Acting Commissioner of Patents and Trademarks*